Figure 1:
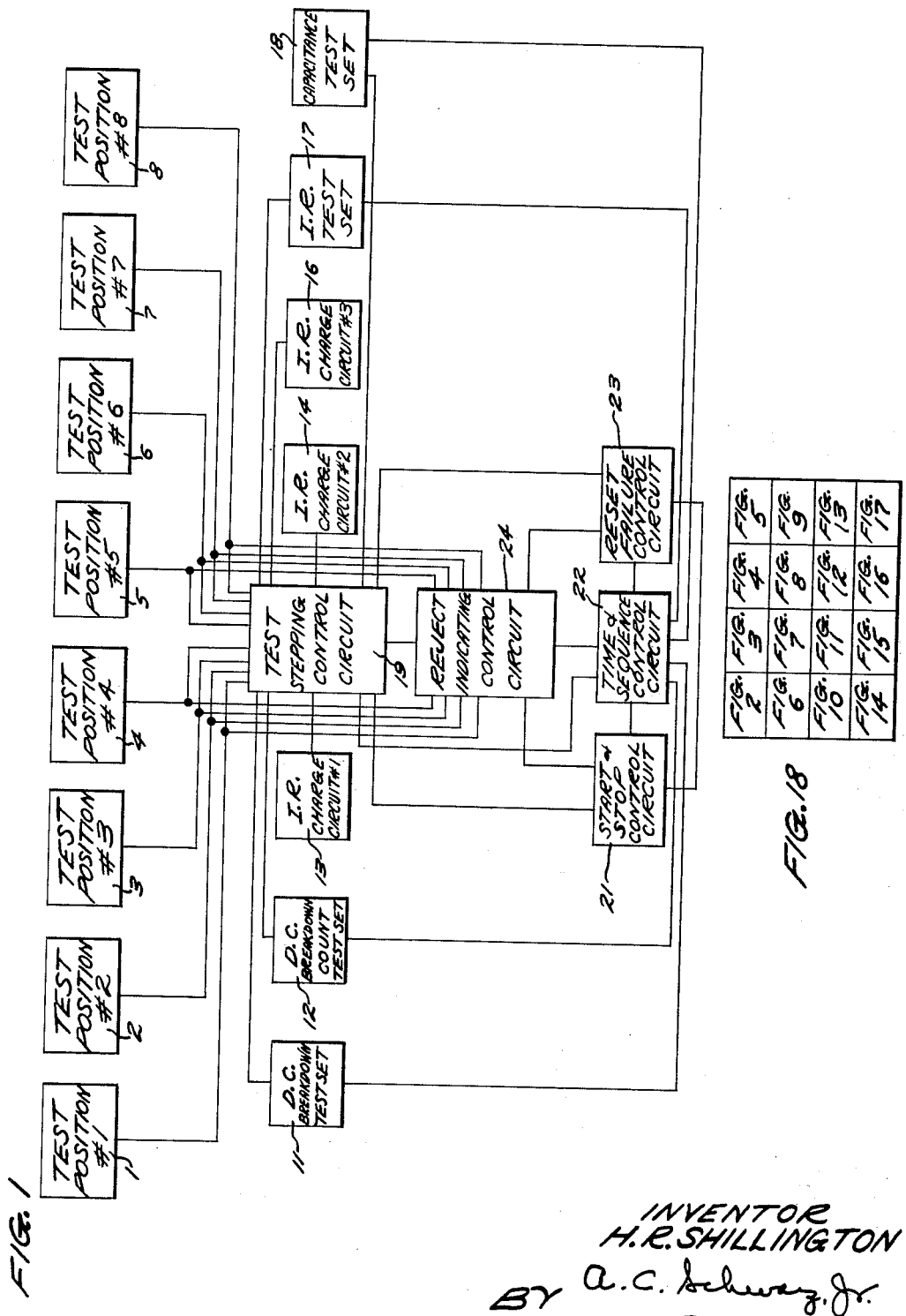

Sept. 11, 1962 H. R. SHILLINGTON 3,054,052
SYSTEM FOR CONNECTING ELECTRICAL NETWORKS
Filed April 29, 1959 19 Sheets-Sheet 1

INVENTOR
H. R. SHILLINGTON
BY A. C. Schwarz, Jr.
ATTORNEY

INVENTOR
H.R. SHILLINGTON
BY a.c. Schwarz, Jr.
ATTORNEY

Sept. 11, 1962 H. R. SHILLINGTON 3,054,052
SYSTEM FOR CONNECTING ELECTRICAL NETWORKS
Filed April 29, 1959 19 Sheets-Sheet 17

INVENTOR
H.R.SHILLINGTON
BY A.C.Schwarz, Jr.
ATTORNEY

FIG. 19

| | TEST FIXTURE POSITION #1 | TEST FIXTURE POSITION #2 | TEST FIXTURE POSITION #3 | TEST FIXTURE POSITION #4 | TEST FIXTURE POSITION #5 | TEST FIXTURE POSITION #6 | TEST FIXTURE POSITION #7 | TEST FIXTURE POSITION #8 |
|---|---|---|---|---|---|---|---|---|
| TEST STEPPING RELAY 230 OPERATED | D.C. BREAKDOWN | | | | | | | |
| TEST STEPPING RELAY 380 OPERATED | D.C. BREAKDOWN COUNT | UNLOAD | | | | | | |
| TEST STEPPING RELAY 420 OPERATED | I.R. CHARGE #1 | D.C. BREAKDOWN | CAPACITANCE TEST | | | | | |
| TEST STEPPING RELAY 470 OPERATED | I.R. CHARGE #2 | D.C. BREAKDOWN COUNT | UNLOAD | | | | | |
| TEST STEPPING RELAY 510 OPERATED | I.R. CHARGE #3 | I.R. CHARGE #1 | D.C. BREAKDOWN | CAPACITANCE TEST | | | | |
| TEST STEPPING RELAY 560 OPERATED | I.R. TEST | I.R. CHARGE #2 | I.R. CHARGE #1 | D.C. BREAKDOWN COUNT | UNLOAD | | | |
| TEST STEPPING RELAY 600 OPERATED | CAPACITANCE TEST | I.R. TEST | I.R. CHARGE #3 | I.R. CHARGE #2 | I.R. CHARGE #1 | D.C. BREAKDOWN | CAPACITANCE TEST | |
| TEST STEPPING RELAY 640 OPERATED | UNLOAD | CAPACITANCE TEST | I.R. TEST | I.R. CHARGE #3 | I.R. CHARGE #2 | I.R. CHARGE #1 | D.C. BREAKDOWN COUNT | UNLOAD |
| TEST CYCLE #1 | | UNLOAD | CAPACITANCE TEST | I.R. TEST | I.R. CHARGE #3 | I.R. CHARGE #2 | I.R. CHARGE #1 | D.C. BREAKDOWN |
| TEST CYCLE #2 | | | UNLOAD | CAPACITANCE TEST | I.R. TEST | I.R. CHARGE #3 | I.R. CHARGE #2 | D.C. BREAKDOWN COUNT |

TEST SEQUENCE CHART

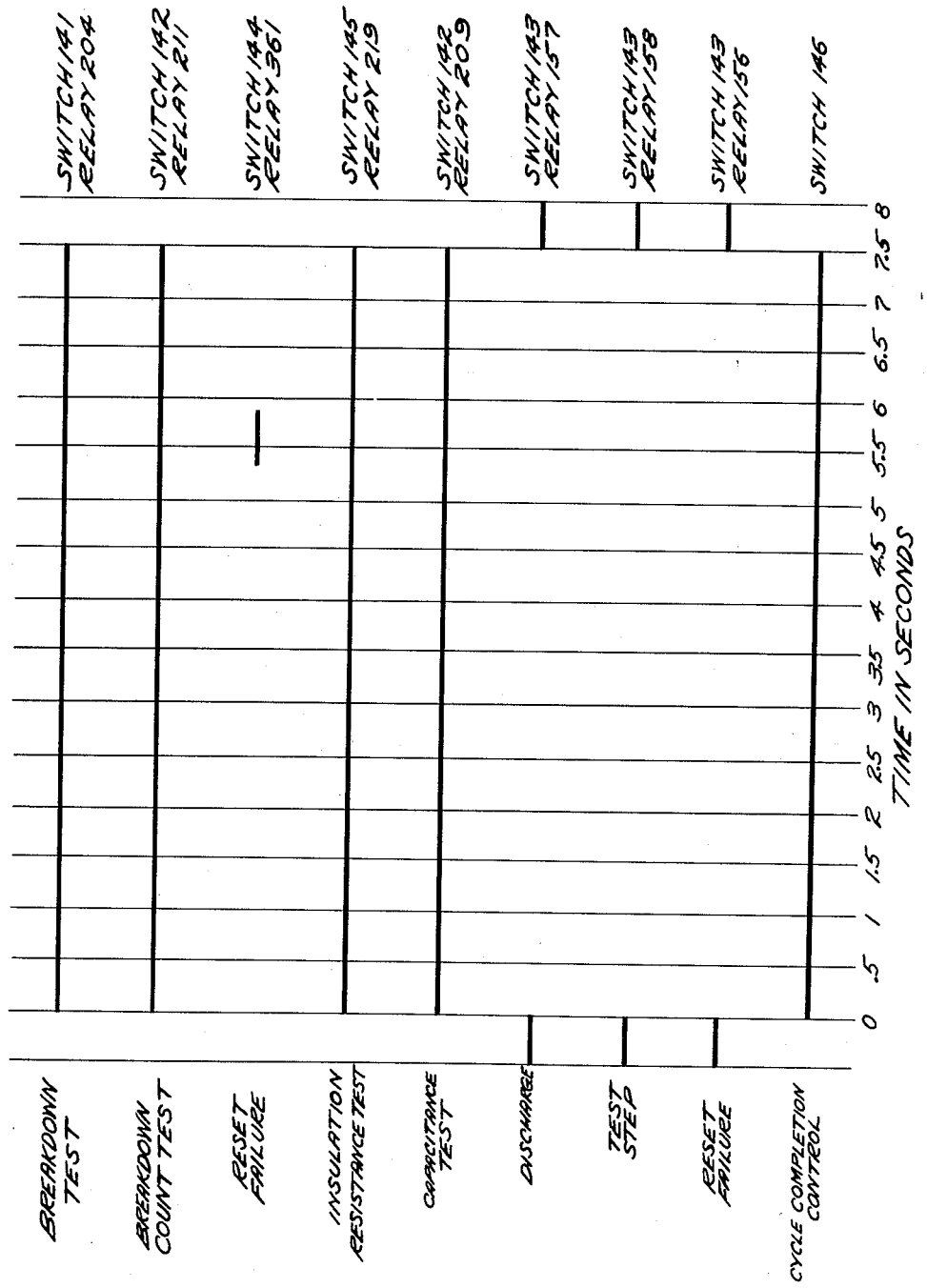

United States Patent Office 3,054,052
Patented Sept. 11, 1962

3,054,052
SYSTEM FOR CONNECTING ELECTRICAL
NETWORKS
Harry R. Shillington, Glen Ellyn, Ill., assignor to Western
Electric Company, Incorporated, New York, N.Y., a
corporation of New York
Filed Apr. 29, 1959, Ser. No. 809,749
13 Claims. (Cl. 324—73)

This invention relates to a system for connecting electrical networks, and more particularly to a testing system for connecting a plurality of networks, such as test sets and test conditioning circuits, to a plurality of other networks, such as electrical devices or components, in a predetermined sequence wherein the devices are continuously connected to different test sets and test conditioning circuits until all devices have received all tests. This invention also relates to a semi-automatic stepping device which is especially useful as an integral part of the system for connecting electrical networks.

In the manufacturing of electrical networks, components or other electrical devices, such as capacitors, each device must be subjected to a plurality of tests to insure a high quality of product. In performing these multiple tests it is necessary to connect the leads of each capacitor, network or other electrical device to the terminals of each test set or test conditioning circuit individually, thereby requiring a considerable amount of time. Typically, two automatic type systems are used to increase the speed of such testing operations and comprise (1) mounting the capacitors on a conveyor or turntable and guiding the capacitors past a plurality of wipers for connecting the capacitors to the test sets and (2) connecting each capacitor to a pair of terminals and successively connecting the test sets and test conditioning circuits to the pair of terminals.

The use of conveyors and turntables to connect the capacitors to test sets requires complex and highly synchronized machinery, which is space consuming and expensive in both original and maintenance costs. The connecting of a plurality of test sets and test conditioning circuits to a pair of terminals to which a capacitor is connected can be expeditiously performed if a plurality of test positions or terminals are used and the capacitors at the test positions are each simultaneously and continuously tested. Prior art testing systems of this type have depended upon the testing of each capacitor individually, and the testing of the other capacitors at other test positions have been delayed until the capacitor under test has been completely or partially tested. Also, difficulties have been encountered in coordinating the connections of the many test sets and test conditioning circuits to insure that each capacitor connected to a single pair of terminals completely receives every test.

It is therefore an object of this invention to provide a new and improved system for connecting electrical networks.

An additional object of this invention is to provide a new and improved semi-automatic stepping device.

Another object of the present invention is to provide a system for connecting a first group of networks to a second group of networks in a predetermined sequence whereby each network of the first group is connected to each network of the second group.

Another object of this invention is to provide a testing system having a plurality of test positions to which electrical devices are connected and a control circuit for sequentially connecting each of a plurality of test sets and test conditioning circuits to each test position such that each device is simultaneously and continuously tested and is not delayed by the tests performed at the other test positions.

In furtherance of the preceding object, it is another object of this invention to provide one more test position than the number of test sets and test conditioning circuits to permit loading and unloading of one of the test positions while the others are being tested.

A further object of this invention is to provide a testing system having a predetermined number of test sets and test conditioning circuits, test positions for connecting components thereto numbering one greater than the number of test sets and test conditioning circuits for allowing one position to be unloaded and reloaded while the other positions are being tested, a cyclic means for sequentially connecting every test set and test conditioning circuit individually to every test position whereby each test position is continuously tested and is not delayed by the tests at the other positions, and means for stopping the testing of components at the end of every test cycle until an operator unloads a component which is completely tested, reloads that test position and resets the testing system for further operation.

In furtherance of the preceding object, it is an object of this invention to provide means for resetting the testing system to actuate a subsequent test cycle at any time during a present test cycle without the subsequent cycle starting until the present cycle is completed.

In furtherance of the preceding objects, it is another object of this invention to provide the testing system with a means for stopping all units of the testing system in any instant, but allowing the testing system to again start only at the beginning of a testing cycle and only with the first test set or conditioning circuit connected to the first test position to insure that every component completely receives every test.

A further object of this invention is to provide the testing system with a means for disconnecting a component upon failure of any test from all successive tests until the component may be unloaded from the test position without effecting or altering the testing of the other components.

A still further object of this invention is to provide the testing system with circuitry for indicating which test set or test conditioning circuit is connected to the various test positions and which test position is conditioned for unloading and reloading and for indicating the particular test that a component has failed.

With these and other objects in view, the present invention contemplates a testing system having a plurality of networks, such as test sets and test conditioning circuits, for testing the quality of components or other electrical devices. The testing system is provided with a plurality of test positions each having a pair of terminals to which the electrical devices to be tested are connected. A cyclically operated test stepping control circuit simultaneously connects each of the networks to one of the test positions and conditions one of the test positions for the unloading of a device completely tested and the reloading of a device to be tested, all in one cycle of operation. Additional control circuits operate the test stepping control circuit through a series of operating cycles in such a manner that the test stepping control circuit varies the connections between the networks and the test positions to connect each test position sequentially to each network and condition each test position for unloading and reloading. In this manner, the test stepping control circuit continuously operates to connect every test position, and therefore the devices connected thereto, to every testing network such that after a first series of operating cycles, the test stepping control circuit produces a fully tested capacitor after each additional operating cycle.

In operation, the test stepping control circuit connects every test set and test conditioning circuit to one of the test positions and conditions one test position for the unloading of a device completely tested, and then automatically prevents a successive testing cycle from being initiated. During each testing cycle an operator unloads the test position so conditioned, reloads the test position with a device to be tested and resets the test stepping condition circuit to initiate the next operating cycle. If the operator unloads, reloads and resets the test position conditioned for unloading during the present testing cycle, then the test stepping control circuit immediately initiates the successive cycle of operation after the completion of the present testing cycle.

A circuit is also provided for immediately stopping the testing system at any instant in the testing operation but allows the testing system to again resume testing operations only at the beginning of a test cycle and only with the first test set or test conditioning circuit connected to the first test position, thereby insuring that every device at the test positions will receive completely every test. A circuit is also provided for preventing any device failing any of the tests from being connected to any successive test set or test conditioning circuit until the test position to which the defective device is connected is conditioned for unloading. The testing system is also provided with indicating means for indicating the test being performed at every test position, the test position to be unloaded during each cycle of operation and any test which a device fails to pass.

Other objects, advantages and novel aspects of the invention will become apparent upon consideration of the following detailed description in conjunction with the accompanying drawings wherein:

FIG. 1 is a block diagram of a multiple testing system embodying the principles of the present invention;

FIGS. 2 through 17 disclose a schematic circuit diagram of the multiple testing system shown in FIG. 1;

FIG. 18 discloses the proper arrangement of FIGS. 2 through 17 in disclosing the multiple testing system;

FIG. 19 discloses a test sequence chart indicating the test set or test conditioning circuit connected to each test fixture for each cycle of operation; and FIG. 20 discloses a timing chart of the relays which control the timing and sequence of the testing system.

*General Operation*

It is to be understood that the testing system to be described hereinafter as comprising eight test positions for connecting capacitors to seven specific test sets and test conditioning circuits is not limited to these specific elements or the numbers thereof, the particular type of electrical devices to be tested, nor the type of tests and conditioning circuits used to test the devices. Other types of electrical devices may be tested and the number thereof which are to be simultaneously tested may be varied depending upon the number and types of tests to be applied thereto. Further, the time limits of the tests and the timing operation of the testing system are merely typical of the specific testing system described hereinafter.

The testing system disclosed in block diagram form (FIG. 1) and disclosed in detail in FIGS. 2–17 comprises eight test positions numbered 1–8 consecutively which are connectible to a D.C. breakdown test set 11, a D.C. breakdown count test set 12, insulation resistance charge circuits 1, 2 and 3 designated 13, 14 and 15, respectively, an insulation resistance test set 17 and a capacitance test set 18 through a test stepping control circuit 19. The test positions 1–8 are disclosed in FIGS. 2–5 with only test positions 1 and 2 disclosed in detail and test positions 3–8 disclosed in block form. It is to be understood that the circuit details of positions 3–8 are identical with those disclosed in connection with test positions 1 and 2. The test stepping control circuit 19 is under the simultaneous control of a start and stop control circuit 21 for initially energizing the stepping control circuit 19, a time and sequence control circuit 22 which controls the detailed operation of the stepping control circuit 19, and a reset failure control circuit 23 which controls the automatic recycling of the stepping control circuit 19.

Under the operation of control circuits 21, 22 and 23, the test stepping control circuit 19 operates to simultaneously connect each of the test sets and test conditioning circuits 11–14 and 16–18 to one of the test positions 1–8 for each cycle of operation, thereby leaving one of the test positions free for unloading and reloading an electrical component, such as a capacitor, to the test positions. Under the control of the time and sequence control circuit 22, the test stepping control circuit 19 operates through eight cycles of operation, varying the connections between the test positions and the test sets and test conditioning circuits such that each test position, and thereby each capacitor connected thereto, is connected to each test set and test conditioning circuit, and is conditioned for unloading and reloading during the eight cycles of operation. Therefore, after the first eight cycles of operation of control circuit 19, a capacitor is completely tested and conditioned for unloading upon each subsequent operating cycle of the control circuit. 19. The test stepping control circuit 19 also operates a series of indicating lamps which disclose to an operator the specific test set or test conditioning circuit that is connected to each of the test positions during any cycle of operation of the stepping control circuit 19, and also indicates which of the test positions is conditioned for unloading and reloading of a capacitor.

The test stepping control circuit 19 also operates a rejection indicating control circuit 24, which is in turn connected to each of the test positions 1–8. The rejection indicating control circuit 24 interconnects reject circuits, of any commercially available type within each of the test sets 11, 12, 17 and 18 to the particular test positions to which the test sets are connected during each cycle of operation. The rejection indicator control circuit 24, upon receiving a signal from one of the reject circuits in a test set indicating that a capacitor has failed to pass a test, (1) immediately discharges the capacitor failing the test and maintains the capacitor discharged until that test position is conditioned for unloading and reloading and (2) actuates an indicating means operable within each of the test positions for indicating which of the tests the capacitor failed. The reject indicating control circuit 24 allows a failed capacitor to remain discharged without affecting the time, sequence, or testing operations performed on each of the capacitors at the other test positions.

Figure 17:
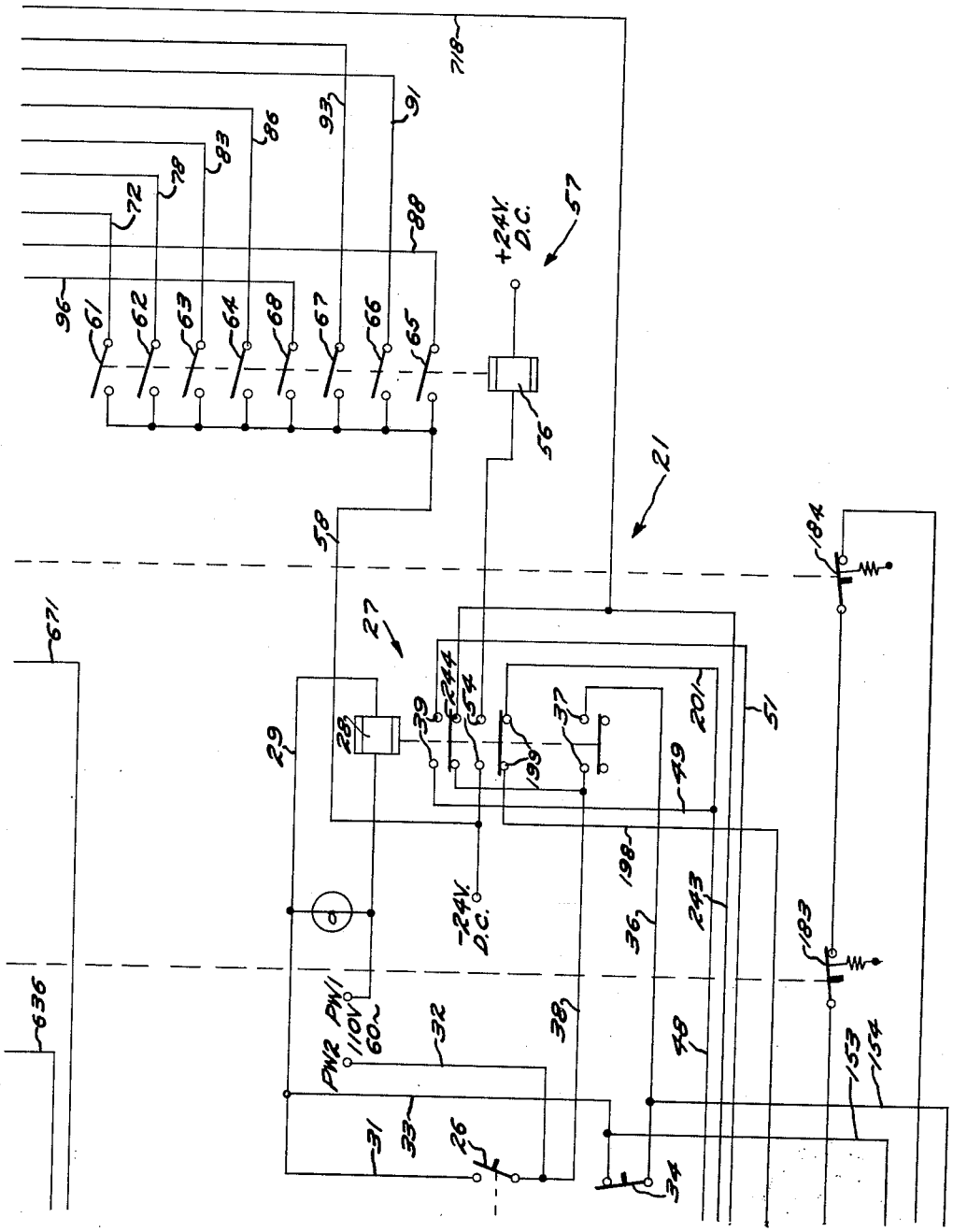

The start and stop control circuit 21, disclosed in detail in FIG. 17, initially energizes the testing system for operation. The control circuit 21 has provisions for immediately stopping all testing operations of the testing system at any instant within any testing cycle to immediately discharge all capacitors at all test positions and automatically resets the test stepping control circuit 19 to connect the first test set, or the D.C. breakdown test set 11, to test position 1 upon subsequent operation of the testing system. Upon the starting of testing operations by means of the start and stop control circuit 21, the time and sequence control circuit 22, disclosed in detail in FIGS. 10 and 14, prevents the starting portion of the control circuit 21 from becoming effective until the time and sequence control circuit 22 is in position to operate the test stepping control circuit 19 at the beginning of a test cycle. Therefore, whenever the testing system is stopped by means of the control circuit 21, the testing system cannot again be operated until the beginning of a testing cycle and until the D.C. breakdown test set 11 is connected to the test position 1.

The reset failure control circuit 23 prevents the time and sequence control circuit 22 and the stepping control circuit 19 from starting a successive cycle of operation until the test position indicated as being conditioned for unloading and reloading has been manually reset by the operator. However, if the operator unloads a fully tested capacitor from the test position so conditioned, reloads the test position with a capacitor to be tested, and resets the testing system during a present operating cycle, the reset failure control circuit 23 does not operate to stop the testing operations and the subsequent cycle of operation is initiated immediately upon termination of the present operating cycle.

Test Start and Test Preparation

Referring now to FIGS. 10, 14, 16 and 17, it will be assumed that a capacitor to be tested has been placed in each of the eight test positions, that power has been turned on to the various A.C. and D.C. terminals so designated throughout the sheets 2–17 by a means not shown and that the test set is not operating as a stop button 26 (FIG. 17) has been closed. The closure of the stop button 26 provides an energizing circuit for a relay 27 from terminal 1 of an A.C. source through the windings 28 of the relay 27, conductors 29 and 31, the stop button 26, to terminal 2 of an A.C. power source through conductor 32 causing the relay 27 to operate. Operation of the relay 27 provides a locking circuit independent of the stop button 26 from terminal 1 of the A.C. power source through the winding 28 of the relay 27, conductors 29 and 33, a start button 34, a conductor 36, contacts 37 of the operated relay 27, conductors 38 and 32 to terminal 2 of the A.C. power source.

The closure of contacts 39 of the relay 27 completes an energizing circuit for a stepping relay 41 (FIGS. 10 and 14) which steps wipers 42, 43 and 44 along banks 1, 2 and 3 of a multiple contact switch bank having eight contacts on each bank. This circuit is energized and is maintained in an energized condition so long as the wiper 43 of the second bank is in contact with any of the contacts except a last contact 46. This energizing circuit is traced from the positive side of a 24 volt D.C. source through a winding 47 of the relay 41, conductors 48 and 49, the contacts 39 of the relay 27, a conductor 51 to any one of contacts 52, the wiper 43 and a conductor 53 to a negative terminal of a 24 volt D.C. source. The relay 41 thereby operates and continues to operate until the wipers 42, 43 and 44 are engaging the last contacts of the three banks. This circuit insures that the testing system will always start in the same position every time the system is stopped by the stop button 26.

The closure of contacts 54 upon the operation of the relay 27, closes an obvious energizing circuit through a winding 56 of a relay 57 thereby placing a negative terminal of a 24 volt D.C. source on the now closed contacts 61–68 of the relay 57 through a conductor 58. The negative terminal of the D.C. source applied to the contacts 61 of the relay 57 closes an energizing circuit for a relay 71 (FIG. 2) to discharge the capacitor connected to test position 1 through ground. This circuit is traced from the contacts 61, conductors 72 and 73, a winding 74 of the relay 71 and a conductor 76 to a positive terminal of a 24 volt D.C. source. The negative terminal of the D.C. source applied to the contacts 62 of the relay 57 completes an energizing circuit for a relay 77 (FIG. 3) to discharge the capacitor connected to test position 2 through ground. This energizing circuit is traced from the contacts 62, conductors 78 and 79, a winding 81 of the relay 77, and conductors 82 and 76 to the positive terminal of the 24 volt D.C. source.

The contacts 63–68 of the relay 57 apply the negative terminal of the D.C. source to test positions 3–8 to energize relays (not shown) similarly connected as the relays 71 and 77 to discharge the capacitors connected to test positions 3–8 through ground. The contacts 63 make this connection through conductors 83 and 84 to test position 3; the contacts 64 make the connection through conductors 86 and 87 to test position 4; the contacts 65 make the connection through conductors 88 and 89 to test position 5; the contacts 66 make the connection through conductors 91 and 92 to test position 6; the contacts 67 make the connection through conductors 93 and 94 to test position 7; and contacts 68 make the connection through conductors 96 and 97 to test position 8.

The capacitor connected to test position 1 is discharged to ground from a terminal 98, contacts 99 and 101 of a relay 102 through the now closed contacts 103 and 104 of the relay 74 to ground and from a terminal 106 through contacts 107 and 108 of the relay 102, closed contacts 109 and 111 of the relay 71 and a resistor 112 to ground. The capacitors at the other test positions 2–8 are similarly discharged to ground by the operation of the relays similar to relay 71 at each test position.

When the stop button 26 (FIG. 17) was depressed, auxiliary contacts 113 (FIG. 16) of the stop button 26 opened a circuit in the reset failure control circuit 23 to insure that a relay 114 (FIG. 16) is in a non-operated condition and thereby insures the closure of contacts 116 and 117. Closure of the contacts 116 and 117 closes an energizing circuit from terminal 1 of an A.C. power source through a conductor 118, the contacts 116 and 117, a conductor 119 and through a winding of a relay 121 (FIG. 10) to terminal 2 of A.C. power source thereby operating the relay 121. The relay 121 closes contacts 122 to connect an A.C. power source across a synchronous timing motor drive unit 123 of a commercially available type. The timer unit 123 drives a shaft 124 to rotate cams 131–136 which operate switches 141–146, respectively.

The testing system is now stopped with all the capacitors connected to test positions 1–8 discharged, the wipers 42, 43 and 44 of banks 1, 2 and 3 of the multiple stepping switch positioned on the last contacts, and the timer unit 123 is energized for rotating the shaft 124 and the cams 131–136 connected thereto.

When it is desired to start testing operations of the testing system, the start button 34 (FIG. 17) is depressed to open the locking energizing circuit for the relay 27. The relay 27 thereby restores and removes the grounded discharge paths for the capacitors connected to test positions 1–8 by restoring the relay 57, which in turn restores the relay 71 of test position 1, the relay 77 of test position 2 and the similar relays in test positions 3–8 operated by the contacts 61–68 of the relay 57. To insure that the start button 34 will not be effective to restore the relay 27 until the timer unit 123 has rotated the cams 131–136 to a position to start the testing at the beginning of a testing cycle, the cam 136 maintains the switch 146 in a closed position to shunt the start button 34 through conductors 153 and 154. The shaft 124, and therefore the cams 131–136, makes one complete 360° turn, or one cycle, in eight seconds and the cam 136 maintains the switch 146 in a closed position for all but the last half second of each cycle of rotation of the shaft 124.

As seen in the timing chart (FIG. 20), the last half second of rotation of the cams 131–136 provides a test preparation period before the initiating of the first full cycle of operation and a test reset period in between operating cycles which leaves a seven and one half second testing period. Therefore, as the shunt placed across the start button 34 by the switch 146 is only removed during the last half second of each cycle of rotation of the timing shaft 124, the start button 34 will not become effective to restore the relay 27 until the cams 131–136 are in a position to start a complete cycle of operation.

During the preparation period, the cam 133 is in position to close the switch 143 to energize relays 156, 157 and 158 to close contacts 159, 161 and 162, respectively. The relay 157 provides a circuit for causing certain of the test positions to discharge the capacitors connected thereto between certain tests where a carry over of charge from one test to the other would interfere with the efficient testing operation. At this point however, as all capacitors at the eight test positions have already been discharged due to the pushing of the stop button 26 and the energizing of relay 27, operation of the relay 157 does not produce any further effect. This relay does become important between consecutive operating cycles which will be discussed later.

The operation of the relay 156 closing the contacts 159, completes a circuit from the negative terminal of a 62 volt D.C. source through the contacts 159, a conductor 163, closed contacts 164 and 165 of a relay 166 (FIG. 16), a conductor 167 and a winding of a relay 168 to the positive terminal of a 62 volt D.C. source thereby operating the relay 168. Operation of the relay 168 closes contacts 169 and 171 while opening contacts 169 and 172.

The opening of the contacts 169 and 172 breaks an energizing circuit for a relay 173 (FIG. 14) which was energized from a positive terminal of a 62 volt D.C. source through conductors 174 and 176, a winding of the relay 173, a conductor 177, the contacts 172 and 169 of the relay 168, a conductor 178, the auxiliary contacts 113 of the stop button 26, reset push buttons 181–188, a conductor 191 to a negative terminal of a 62 volt D.C. source. The closing of the contacts 169 and 171 of the relay 168 closes a locking circuit for this relay from the positive terminal of a D.C. source through the winding of the relay 168, conductors 167 and 192, a winding of the relay 166, the contacts 171 and 169, the conductor 178, the auxiliary contacts 113 of the stop button 26 to a negative terminal of a D.C. source through the reset buttons 181–188.

The relay 166 does not operate however, as long as relay 156 remains energized, since negative D.C. potential is placed on each side of its winding. Negative potential is placed on one side of this winding through the contacts 171 and 169, the conductor 178, the contacts 113 of stop button 26, the reset buttons 181–188 and the conductor 191 to the negative terminal of a 62 volt D.C. source. Negative potential is placed on the other side of the winding of the relay 166 through the conductor 192, the contacts 165 and 164 of the relay 166, the conductor 163, the contacts 159 of the relay 156 to the negative terminal of a 62 volt D.C. source. When the cam 133 continues to rotate and opens the switch 143, the relay 156 restores to remove the negative D.C. potential from one side of the winding of the relay 166 to allow this relay to operate through the winding of the relay 168 to a positive terminal of a 62 volt D.C. source. The operation of the relay 156 under the action of the cam 133 and the switch 143 constitutes a first reset failure pulse which causes the relays 168 and 166 to operate and lock to condition the reset failure control circuit 23 for a second reset failure pulse.

Operation of the relay 158 (FIG. 14) closes the contacts 162 to close an energizing circuit for the stepping relay 41 from a negative terminal of a 24 volt D.C. source through the closed contacts 162, a conductor 198, contacts 199 of the restored relay 27, conductors 201 and 48, the winding 47 of the stepping relay 41 to a positive terminal of a 24 volt D.C. source. The relay 158 closes the contacts 162 for a sufficient length of time to allow the relay 41 to move the wipers 42, 43 and 44 of banks 1, 2 and 3 one step to position the wipers of the three banks to a contact 202, the first contact 52 and a contact 203, respectively.

*The Testing Period*

After the operation of the relays 156, 157 and 158 to step the wipers 42, 43 and 44 of the multiple switch bank to the contacts 202, 52 and 203, respectively, and to produce the first reset failure pulse to operate the relays 166 and 168, the timer unit 123 rotates the cam 133 to open the switch 143 and restore the relays 156, 157 and 158. Further movement of the shaft 124 under the control of the timer unit 123 causes the closure of the switches 141, 142 and 145 under the action of the cams 131, 132 and 135. Closure of the switch 141 operates a relay 204 to close contacts 206 which causes an operating circuit (not shown) within the D.C. breakdown test set 11 (FIG. 2) to start the D.C. breakdown test. This circuit is from the D.C. breakdown test set 11 through a conductor 207, contacts 206 of the relay 204, through a conductor 208 back to the breakdown test set 11.

Closure of the switch 142 energizes relays 209 and 211 to close contacts 212 and 213, respectively, to complete operating circuits (not shown) in the D.C. breakdown count test set 12 and capacitance test set 18, respectively. The contacts 213 close the operating circuit for the D.C. breakdown count test set 12 through conductors 214 and 216 and the contacts 212 close the operating circuit for the capacitance test set 18 through conductors 217 and 218. Also, closure of the switch 145 operates a relay 219 to close contacts 221 for closing an operating circuit (not shown) for the insulation resistance test set 15 through conductors 222 and 223.

After the restoration of relay 27 (FIG. 17) and the stepping of the wiper 42 to the contact 202, a relay 230 (FIG. 10) is energized closing contacts 231–238. The energizing circuit for the relay 230 is traced from a first terminal of an A.C. power source through a winding 241 of the relay 230, a conductor 242, the contact 202, the wiper 42 of bank 1, a conductor 243, contacts 244 of the relay 27, through the conductors 38 and 32 to a second terminal of an A.C. power source. The operation of the relay 230 and the closure of the contacts 231 through 238 connects the test sets and test conditioning circuits 11–14 and 16–18 to the test positions 1–8 in a manner disclosed in the test sequence chart (FIG. 19) shown in the first cycle of operation when the test stepping relay 230 is operated. The D.C. breakdown test set 11 is connected to test position 1 through conductors 246 and 247, the contacts 231 of the relay 230, conductors 248 and 249, contacts 251 and 252 of a relay 253, a conductor 254, contacts 256 and 109 of the relay 71, the contacts 107 and 108 of the relay 102, the terminal 106 through the capacitor under test to the terminal 98, the contacts 99 and 101 of the relay 102, contacts 103 and 257 of the relay 71, and contacts 258 and 259 of the relay 253 to ground.

The contacts 232 of the relay 230 prepare the capacitor connected to test position 2 for unloading and reloading by discharging the capacitor to ground. This circuit is traced from ground through a resistor 261, a conductor 262, the contacts 232 of the relay 230, conductors 263 and 264, contacts 266 and 267 of a relay 268, contacts 269 and 271 of the relay 77, contacts 272 and 273 of a relay 274, the capacitor under test, contacts 276 and 277 of the relay 274, contacts 278 and 279 of the relay 77 through contacts 281 and 282 of the relay 268 to ground.

The contacts 233–238, respectively, connect the capacitance test set 18 to test position 3, the contacts 234 connect the insulation resistance test set 17 to the test position 4, the contacts 235 connect the insulation resistance charge circuit 2 to the test position 6, the contacts 236 connect the insulation resistance charge circuit 1 to the test position 7, the contacts 237 connect the insulation resistance charge circuit 3 to the test position 5 and the contacts 238 connect the D.C. breakdown count test set to the test position 8. The detailed connection between the capacitance test set 18, the insulation resistance charge circuits 13, 14 and 16 and the insulation resistance test set 17 to the individual test positions will be discussed hereinafter in relation to test positions 1 and 2 when these test positions are connected to the capacitance test set, the insulation resistance charging circuits and the insulation resistance test set.

The contacts 234 of the relay 230 also connect the negative terminal of a 24 volt D.C. source through conductors 283 and 284, the contacts 234, conductors 285 and 286 to a positive terminal of a 24 volt D.C. source through lamps 291, 308, 317, 326, 362, 353, 344 and 335 to indicate that the test fixture 1 is receiving the D.C. breakdown test, the test fixture 2 is conditioned for unloading, the test fixture 3 is receiving the capacitance test, the test fixture 4 is receiving the insulation resistance test, the test fixture 5 is receiving the insulation resistance charge 3, the test fixture 6 is receiving the insulation resistance charge 2, the test fixture 7 is receiving the insulation resistance charge 1 and the test fixture 8 is receiving the D.C. breakdown count test.

*The Test Reset Period*

Figure 14:
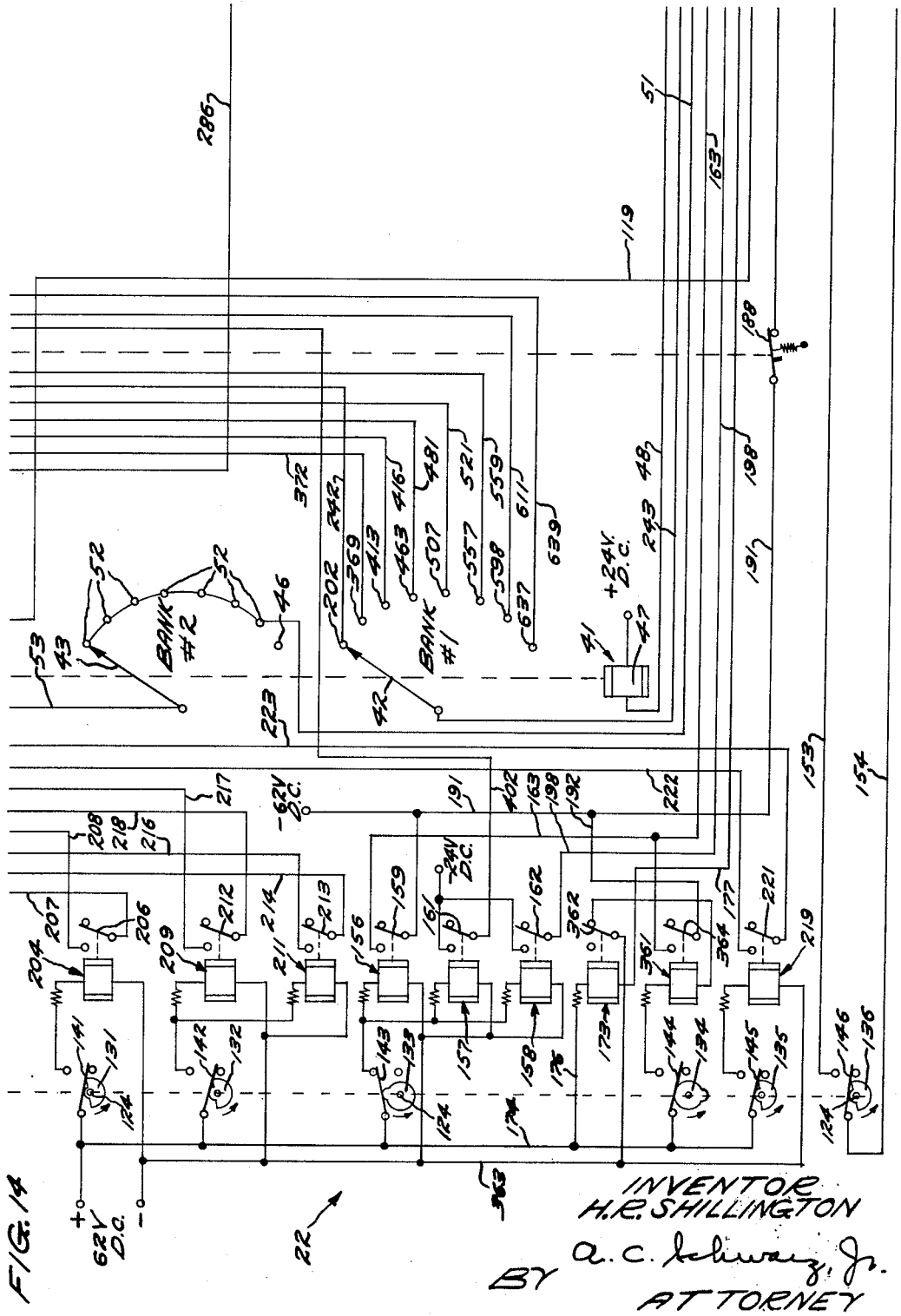
Figure 16:
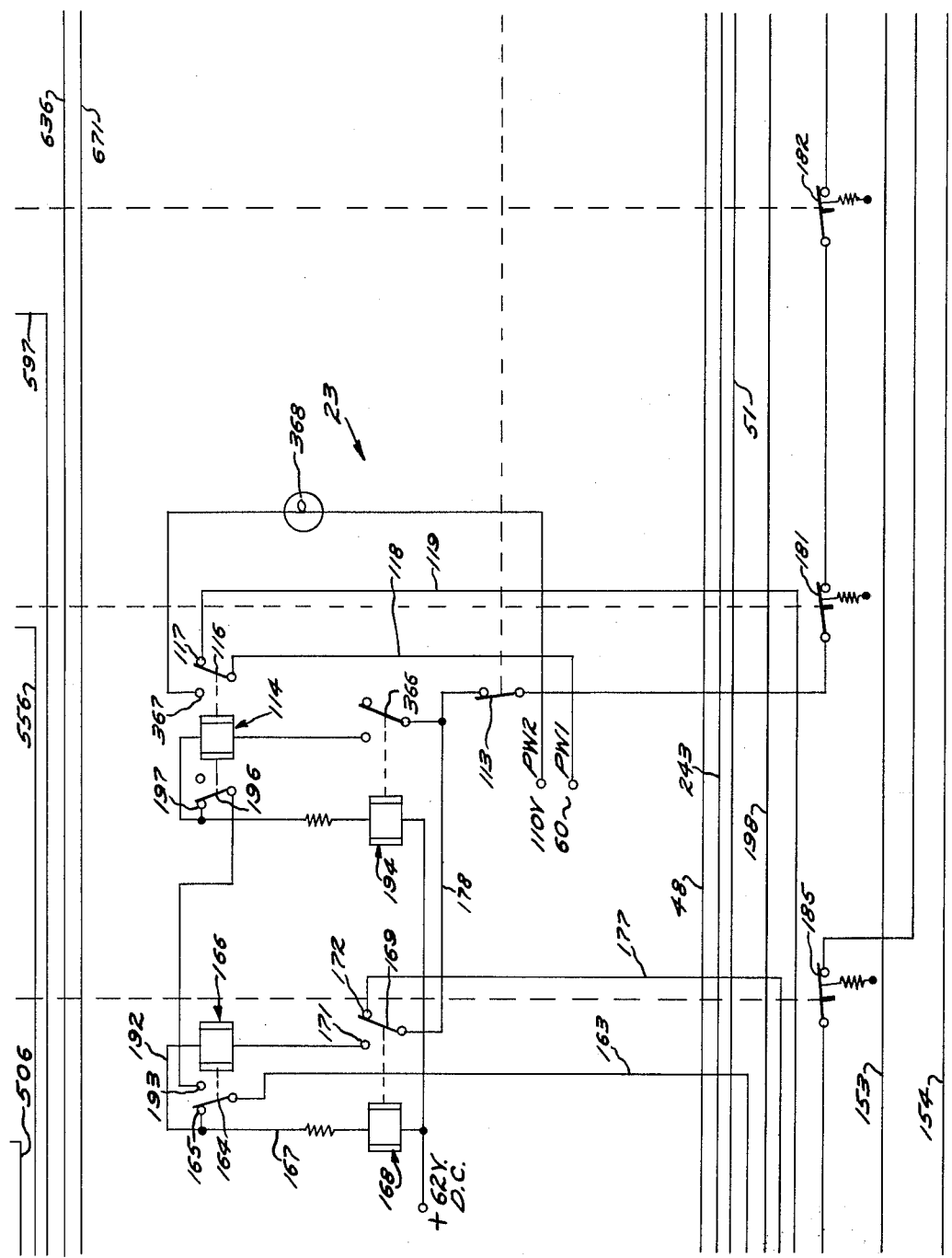

The various tests are applied to the test positions 1–8 by the relay 230 as indicated on the test sequence chart (FIG. 19) for seven and one half seconds as disclosed on the timing chart in FIG. 20 which indicates the length of time that the cams 131, 132 and 135 maintain the switches 141, 142 and 145 closed to energize the relays 204, 209, 211 and 219. After the tests have been in operation for a little more than five seconds, the cam 134 closes the switch 144 to energize a relay 361 (FIG. 14). The energizing circuit for the relay 361 is dependent not only upon the switch 144 being in a closed position, but also upon the relay 173 being in the restored or non-operating position. It will be remembered that the relay 156 produced the first reset failure pulse by closing the contacts 159 to energize the relays 166 and 168 (FIG. 16). The relay 168 opened the contacts 169 and 172 which broke the energizing circuit for the relay 173 to restore this relay. Therefore, the relay 361 is only allowed to operate upon closure of the switch 144 by the cam 134 and after the first reset failure pulse restores the relay 173. The energizing circuit for the relay 361 is traced from a positive terminal of a 62 volt D.C. source through the conductor 174, the switch 144, the winding of the relay 361, closed contacts 362 of the restored relay 173 and a conductor 363 to the negative terminal of a 62 volt D.C. source.

The relay 361 operates to close contacts 364 to form the second reset failure pulse by closing an energizing circuit for the relays 194 and 114 (FIG. 16). This energizing circuit is traced from a negative terminal of a 62 volt D.C. source through the conductors 191 and 192, the closed contacts 364 of the relay 361, the conductor 163 through the contacts 164 and 193 of the operated relay 166, the contacts 196 and 197 of the relay 114 through the winding of the relay 194 to a positive terminal of a 62 volt D.C. source thereby operating the relay 194.

Operation of the relay 194 closes contacts 366 to form a locking circuit for the relay 194 from a positive terminal of a D.C. source of potential, windings of the relays 194 and 114, the contacts 366 of the relay 194, the contacts 113 of the stop button 26, the reset push buttons 181–188, the conductor 199 to a negative terminal of a D.C. source of potential. The relay 114 does not, at this time, operate because negative D.C. potential is applied to both sides of the relay; first through the closed contacts 366 of the relay 194, the contacts 113 of the stop button 26, reset buttons 181–188 and the conductor 191 to negative potential and secondly, through the contacts 197 and 196 of the relay 114, the contacts 193 and 164 of the relay 166, the conductor 163, the contacts 364 of the relay 361 and the conductors 192 and 191 to negative potential. After the cam 134 rotates to open switch 144, the relay 361 restores, opening the contacts 364 to remove negative potential from one side of the relay 114 and allowing the relay to operate through the winding of the relay 194 to positive D.C. potential. Operation of the relay 114 closes contacts 116 and 367 to break the energizing circuit for the relay 121 (FIG. 10) and deenergize the timer unit 123 by opening the contacts 122. This second reset failure pulse caused by the operation of the relay 361 is positioned in a cycle of operation at that point which causes the shaft 124 and cams 131–138 to coast to a stop within the last half second of the eight second operated cycle. The timer unit 123, stopping in the last half second of an operating cycle, positions the cam 133 for closure of the switch 143 to thereby ready the the testing system for a subsequent cycle of operation.

Figure 10:
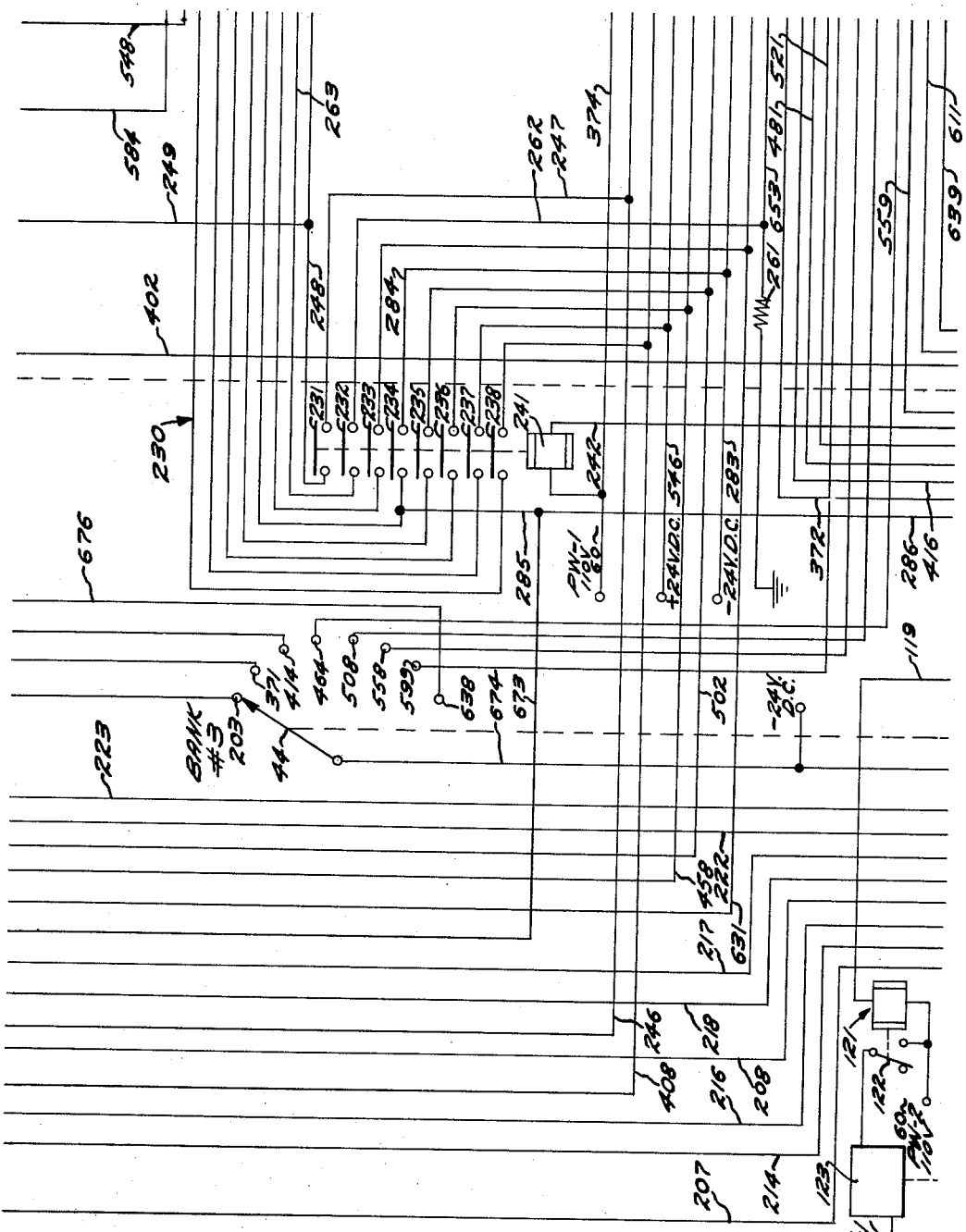
Figure 11:
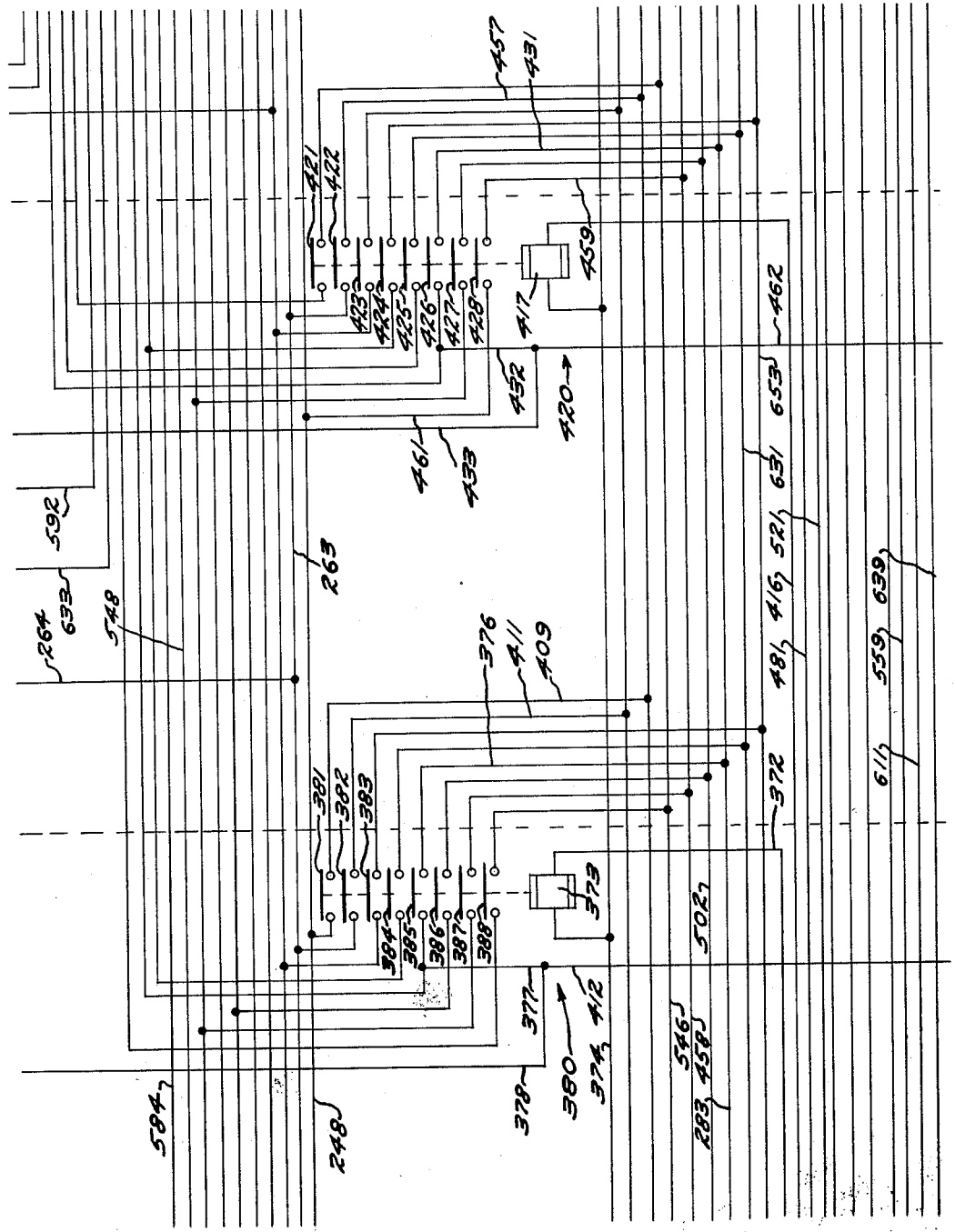
Figure 12:
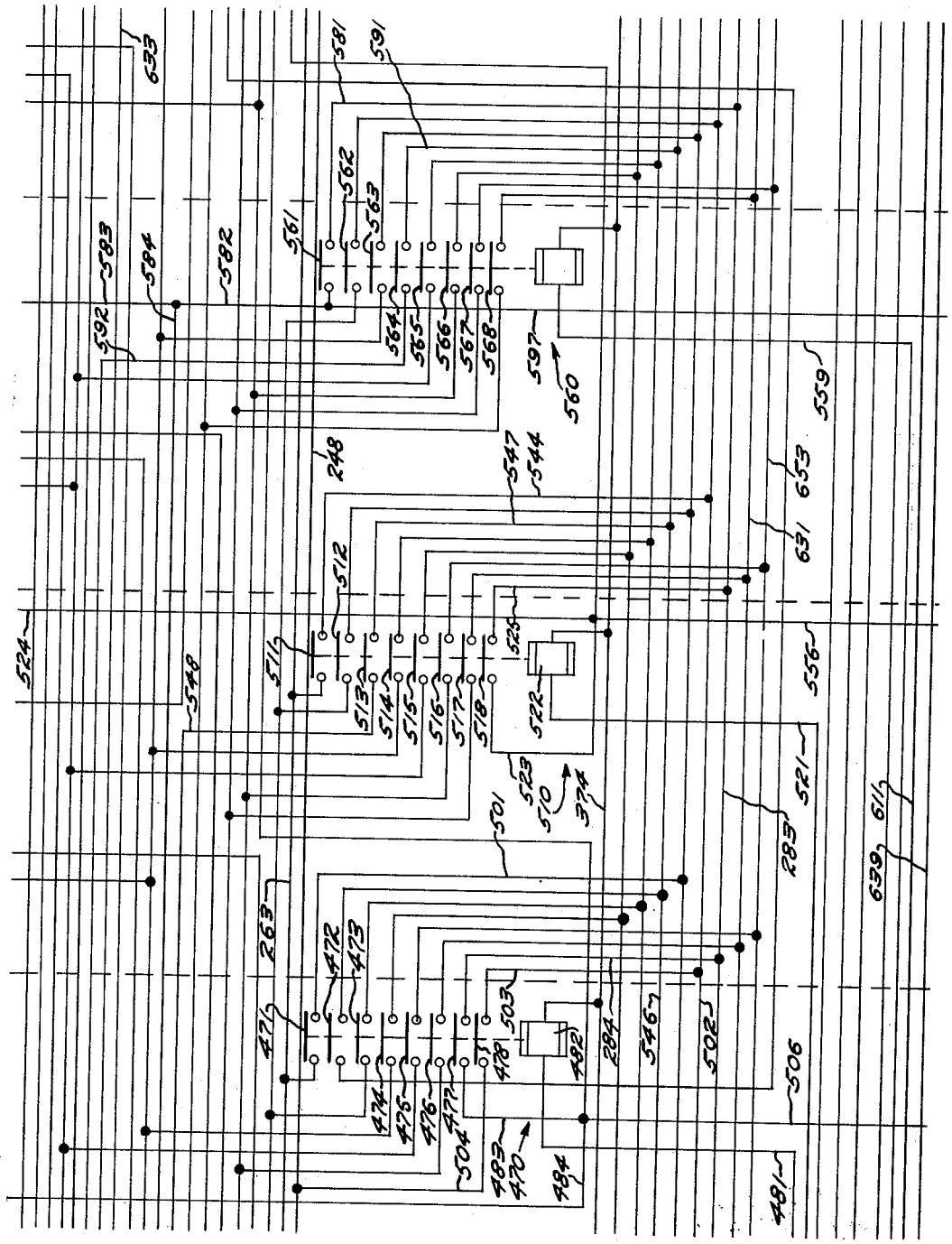
Figure 13:
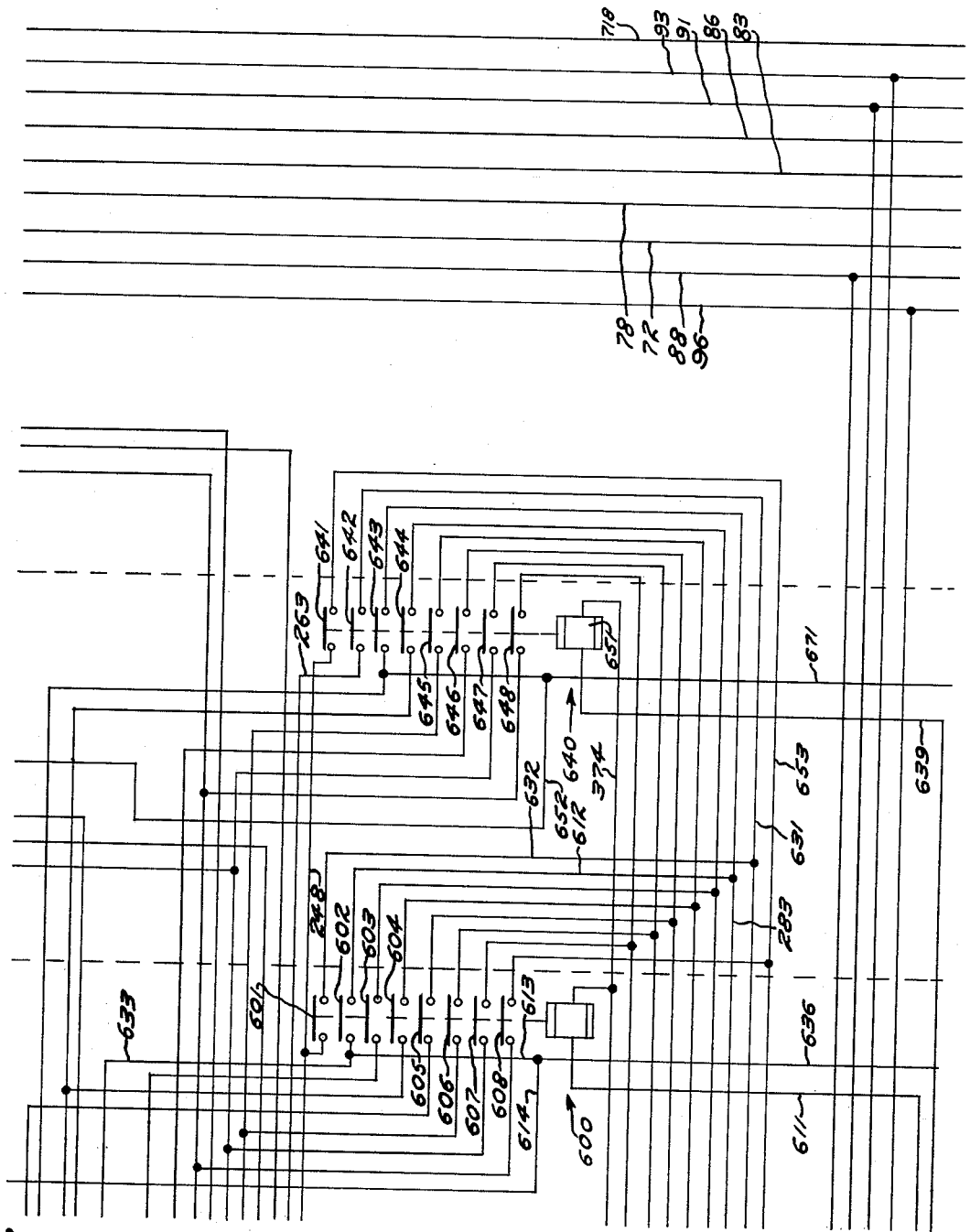
Figure 15:
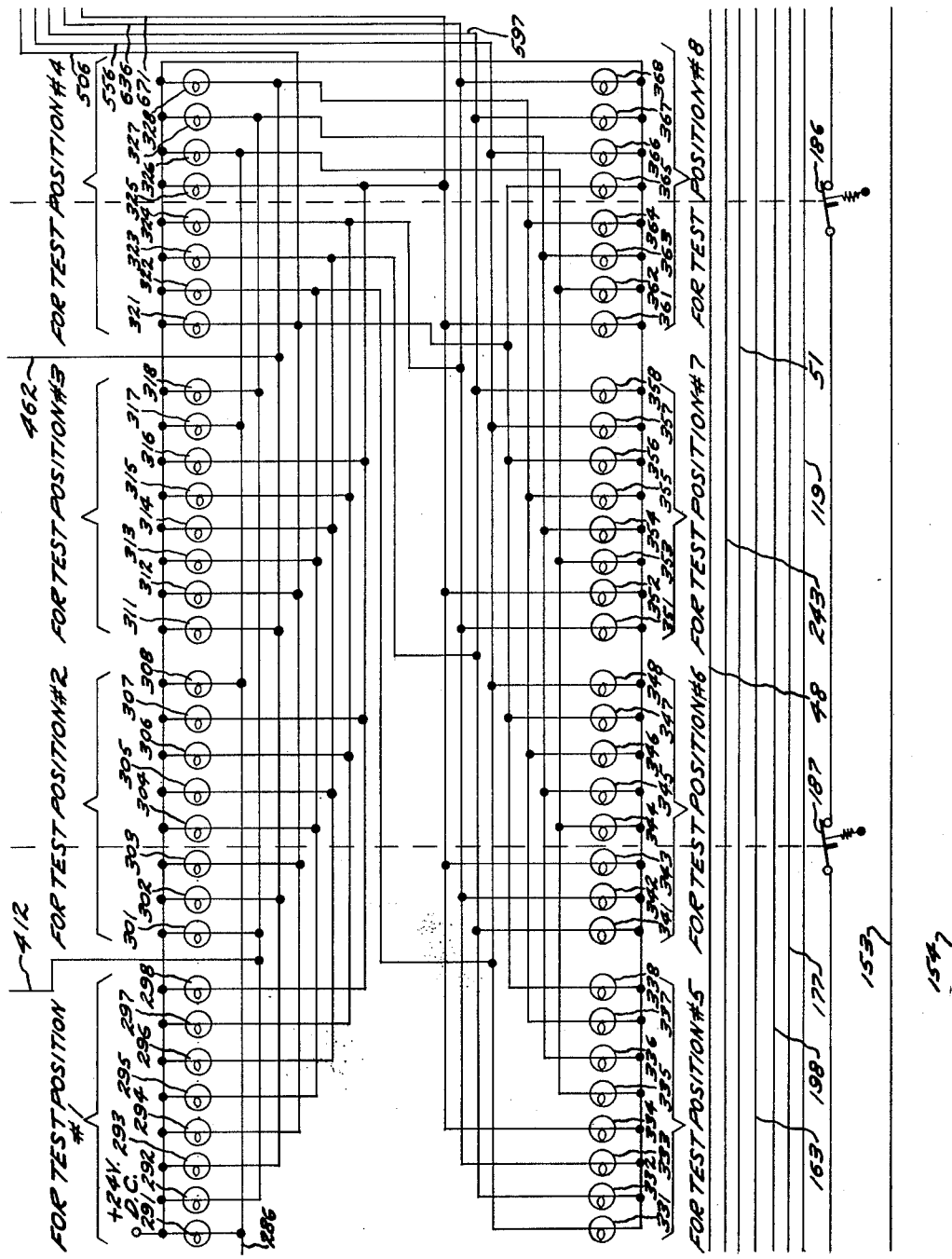

Closure of the contacts 116 and 367 by the operation of the relay 114 (FIG. 16) places lamp 368 across the terminals of an A.C. power source to inform an operator that the second reset failure pulse has been formed to remove power from the timer unit 123. However, under normal operation of the testing system, an operator during the first cycle of operation would be informed that test position 2 was conditioned for loading and unloading by lamp 308 (FIG. 15) energized by the operation of the relay 230 (FIG. 10). Therefore, under normal operation, the operator would remove the capacitor connected to test position 2, replace the capacitor with a new capacitor to be tested and push the reset button 187 (FIG. 15). The reset button 187, if pushed any time during the first operating cycle, will open the locking circuits for the relays 166, 168, 194 and 114 thereby restoring any of these relays which were operated to either prevent power from being removed from the timer unit 123 in case the relay 114 has not yet been operated, or to reapply power to the timer unit 123 if the relay 114 has been operated.

The timer unit 123 continues to rotate until the cams 131, 132 and 135 open the switches 141, 142 and 145, respectively, to restore the relays 204, 209, 211 and 219. Restoration of these relays again open the operating circuits for the D.C. breakdown test set 11, the D.C. breakdown count test set 12, the capacitance test set 18, and the insulation resistance test set 17. The cam 133 now closes the switch 143 to energize the relays 156, 157 and 158. Energization of the relay 156 operates, as previously described, to form the first reset failure pulse for operating the relays 166 and 168 (FIG. 16) to prepare the reset failure control circuit 23 for the second reset failure pulse. The relay 158 also operates, as previously described, to energize the stepping relay 41 to move the wipers 42, 43 and 44 of banks 1, 2 and 3 to engage a contact 369, the second contact 52 and a contact 371, respectively.

The wiper 42 of bank 1 of the multiple switch bank breaks the energizing circuit for the relay 230 to restore this relay and connects an energizing circuit for a relay 380 (FIG. 11) from a terminal 2 of an A.C. power source (FIG. 17) through the conductors 32 and 38, the closed contacts 244 of the relay 27, the conductor 243, the wiper 42 of bank 1, the contact 369, a conductor 372, a winding 373 of the relay 380 to terminal 1 of an A.C. power source through a conductor 374, which operates the relay 380 to close contacts 381–388. Closure of these contacts connects test positions 1–8 to the test sets and test conditioning circuits shown on the test sequence chart (FIG. 19) under the second cycle of operation when the relay 380 is operated. Closure of the contacts 385 of the relay 380 applies a negative terminal of a 24 volt D.C. source (FIG. 10) through conductors 283 and 376, the contacts 385, conductors 377 and 378, a winding 391 of a relay 390 through a conductor 401 to a positive terminal of a 24 volt D.C. source thereby operating the relay 390 and closing contacts 392–398.

As seen from the test sequence chart, the test positions 1, 2 and 4 are about to receive the D.C. breakdown count, the D.C. breakdown and the capacitance tests, respectively, all of which require that the capacitors to be tested are discharged before the tests begin. The relay 157 (FIG. 14) operates during the test reset period to insure that the capacitors at test positions 1, 2 and 4 are discharged before the tests are applied thereto. The relay 157 closes the contacts 161 which connect a negative terminal of a 24 volt D.C. source through the contacts 161, conductors 402 and 403 to the closed contacts 396, 397 and 398 of the relay 390. From the contacts 396, the negative potential is applied to conductors 404, 72 and 73 to operate the relay 71 of test position 1 to discharge the capacitor connected to this test position as previously described. From the contact 397 of the relay 390, the negative D.C. potential is placed on conductors 406, 78 and 79 to operate the relay 77 of test position 2 to discharge the capacitor connected to this test position. From the contacts 398, the negative D.C. potential is applied to conductors 407, 86 and 87 to similarly discharge the capacitor at test position 4.

*Subsequent Testing Cycles*

After the half second reset period of the first operating cycle the timer unit 123 rotates the cams 131, 132 and 135 to close the switches 141, 142 and 145, respectively, to energize the relays 204, 209, 211 and 219. The energization of these relays completes operating circuits for the four test sets as previously described. The contacts 381 of the relay 380 connect the capacitor at test position 1 to the D.C. breakdown count test set 12 from the set 12 through conductors 408 and 409, the contacts 381 of the relay 380, the conductors 248 and 249, the contacts 251 and 252 of the relay 253, the conductor 254, the contacts 256 and 109 of the relay 71, the contacts 107 and 108 of the relay 102, the terminal 106 through the capacitor under test to the terminal 98, the contacts 99 and 101 of the relay 102, the contacts 103 and 257 of the relay 71 and the contacts 258 and 259 of the relay 253 to ground. The contacts 382 of the relay 380 connect the D.C. breakdown test set 11 to test position 2 through conductors 246 and 411, the contacts 382 of the relay 380, the conductors 263 and 264, the contacts 266 and 267 of the relay 268, the contacts 269 and 271 of the relay 77, the contacts 272 and 273 of the relay 274, the capacitor under test, the contacts 276 and 277 of the relay 274, the contacts 278 and 279 of the relay 77, and the contacts 281 and 282 of the relay 268 to ground.

The contacts 382 of the relay 380 connect the capacitor under test to the test position 3 to ground to discharge the capacitor as discussed in the first operating cycle in connection with test position 2. The contacts 384 connect test position 4 to the capacitance test set 18, the contacts 385 connect the test position 5 to the insulation resistance test set 1; the contacts 386 connect the test position 7 to the insulation resistance charge circuit 2; the contacts 387 connect the test position 8 to the insulation resistance charge circuit 1; and the contacts 388 connect the test position 6 to the insulation resistance charge circuit 3.

Closure of the contacts 385 of the relay 380 connect a negative terminal of a 24 volt D.C. source through the conductors 283 and 376, the contacts 385, conductors 377 and 412 through lamps 292, 301, 318, 327, 363, 354, 345 and 336 to a positive terminal of a 24 volt D.C. source. These lamps indicated that the particular tests shown in the test sequence chart as operated by the relay 380 are connected to the eight test positions.

During the second cycle of testing, the operator unloads test position 3 and replaces the tested capacitor with a new capacitor to be tested and pushes the reset button 186 (FIG. 15) to prevent the second reset failure pulse from removing power from the timer unit 123 by restoring all relays in the reset failure control circuit 23. At the end of seven and a half seconds of testing, the cam 133 will again close the switch 143 to operate the relays 156, 157 and 158. The relay 156 will again operate to form the first reset failure pulse which operates and locks the relays 166 and 168 of the reset failure circuit 23. The relay 158 will again close the contacts 162 to operate the stepping relay 41 to step the wipers 42, 43 and 44 to a contact 413, the third contact 52 and a contact 414, respectively. The wiper 42 engaging the contact 413 energizes a relay 420 to close contacts 421–428 through a conductor 416, a winding 417 of the relay 420 and the conductor 374 to a terminal 1 of an A.C. source.

The contacts 421–428 of the relay 420 connect the eight test positions to the test sets and the test conditioning circuits as disclosed in the test sequence chart (FIG. 19) for the third cycle of operation. The contacts 426 of the relay 420 connect a negative terminal of a 24 volt D.C. source through conductors 283 and 431, the contacts 426, conductors 432 and 433, a winding 441 of a relay 440 through the conductor 401 to a positive terminal of a D.C. source thereby operating the relay 440 and closing contacts 442–448.

The relay 157 (FIG. 14) closes the contacts 161 to place negative D.C. potential on the contacts 446, 447 and 448 of the relay 440 from the negative terminal of a D.C. source through the contacts 161 of the relay 157, the conductors 402 and 403 to the contacts 446–448. From the contacts 446, the negative potential is applied through conductors 451, 78 and 79 to the test position 2. From the contacts 447 of the relay 440, the negative potential is applied through conductors 452, 83 and 84 to the test position 3. From the contacts 448 of the relay 440, the negative potential is applied through conductors 453, 454, 88 and 89 to the test position 5. The negative potential is therefore applied to the test positions 2, 3 and 5 to discharge the capacitors connected to these positions as described in connection with the relay 390 in the second cycle of operation to insure that the capacitors are discharged before having the D.C. breakdown count, the D.C. breakdown and the capacitance tests applied thereto.

The timer unit 123 continues to rotate the cams whereby the relays 156, 157 and 158 are restored and the relays 204, 209, 211 and 219 again operate to complete the operating circuits in the four test sets. The contacts 422 of the relay 420 connect the D.C. breakdown count test set 12 to the test position 2 through conductors 408 and 457, the contacts 422, the conductors 263 and 264, the contacts 266 and 267 of the relay 268, the contacts 269 and 271 of the relay 77, the contacts 272 and 273 of the relay 274, the capacitor under test, the contacts 276 and 277 of the relay 274, the contacts 278 and 279 of the relay 77, and the contacts 281 and 282 of the relay 268 to ground. The contacts 428 of the relay 420 connect the insulation resistance charge circuit 1 to the test position 1 through conductors 458 and 459, the contacts 428, conductors 461, 248 and 249 through the capacitor under test to ground by a circuit previously described.

The contacts 421 connect the insulation resistance charge circuit 3 to the test position 7; the contacts 423 connect the D.C. breakdown test set 11 to the test position 3; the contacts 424 conditions the test position 4 for unloading and reloading; the contacts 425 connect the capacitance test set 18 to the test position 5; the contacts 426 connect the insulation resistance test set 17 to the test position 6; and the contacts 427 connect the insulation resistance charge circuit 2 to the test position 8. The contacts 426 of the relay 420 also connect a negative terminal of a D.C. source through conductors 283 and 431, the contacts 426, conductors 432 and 462 to a positive terminal of a D.C. source through lamps 293, 302, 311, 328, 364, 355, 346 and 337 to indicate the particular test sets and test conditioning circuits that are connected to the test positions 1–8 in the third cycle of operation.

Figure 2:
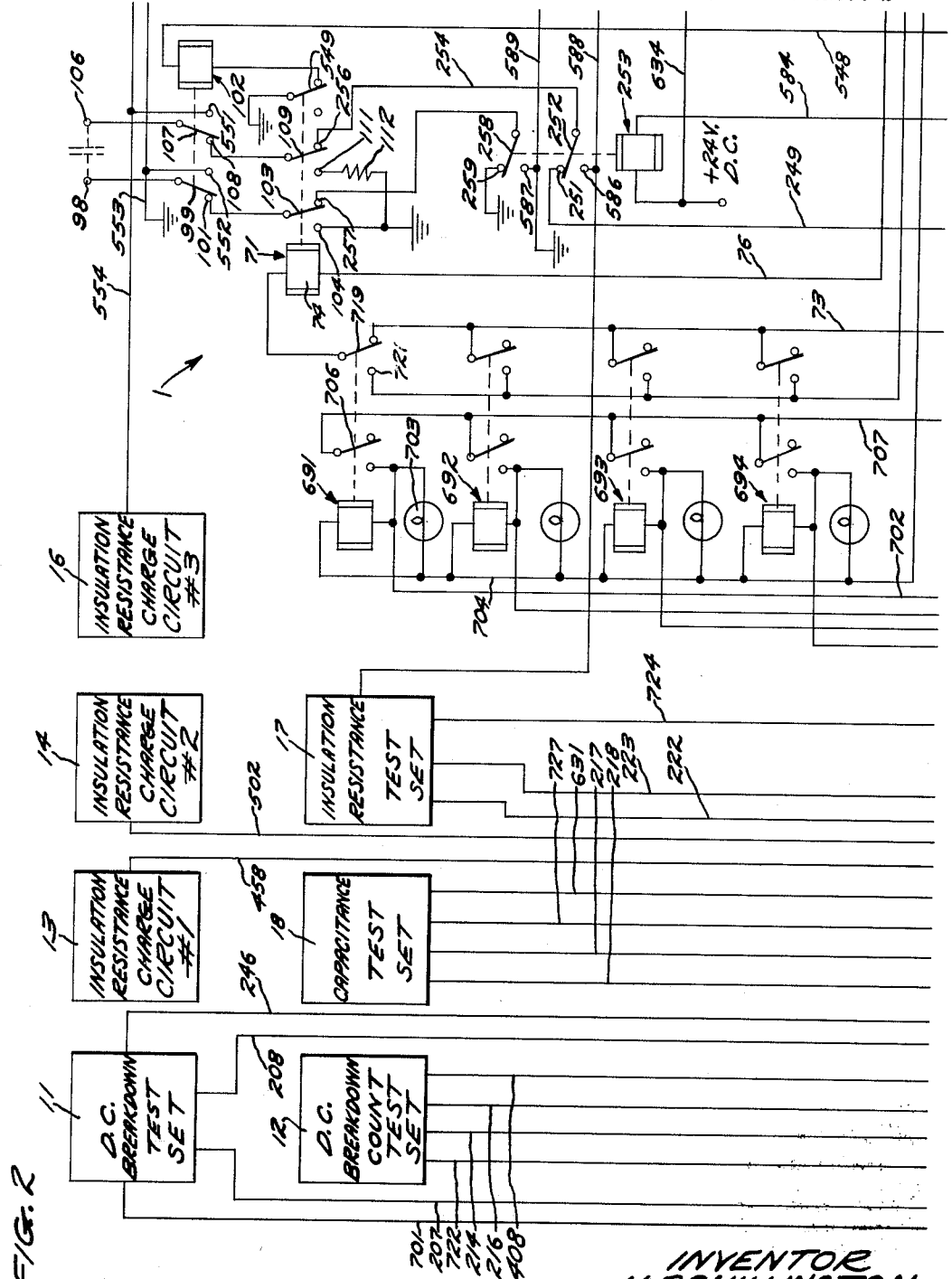
Figure 3:
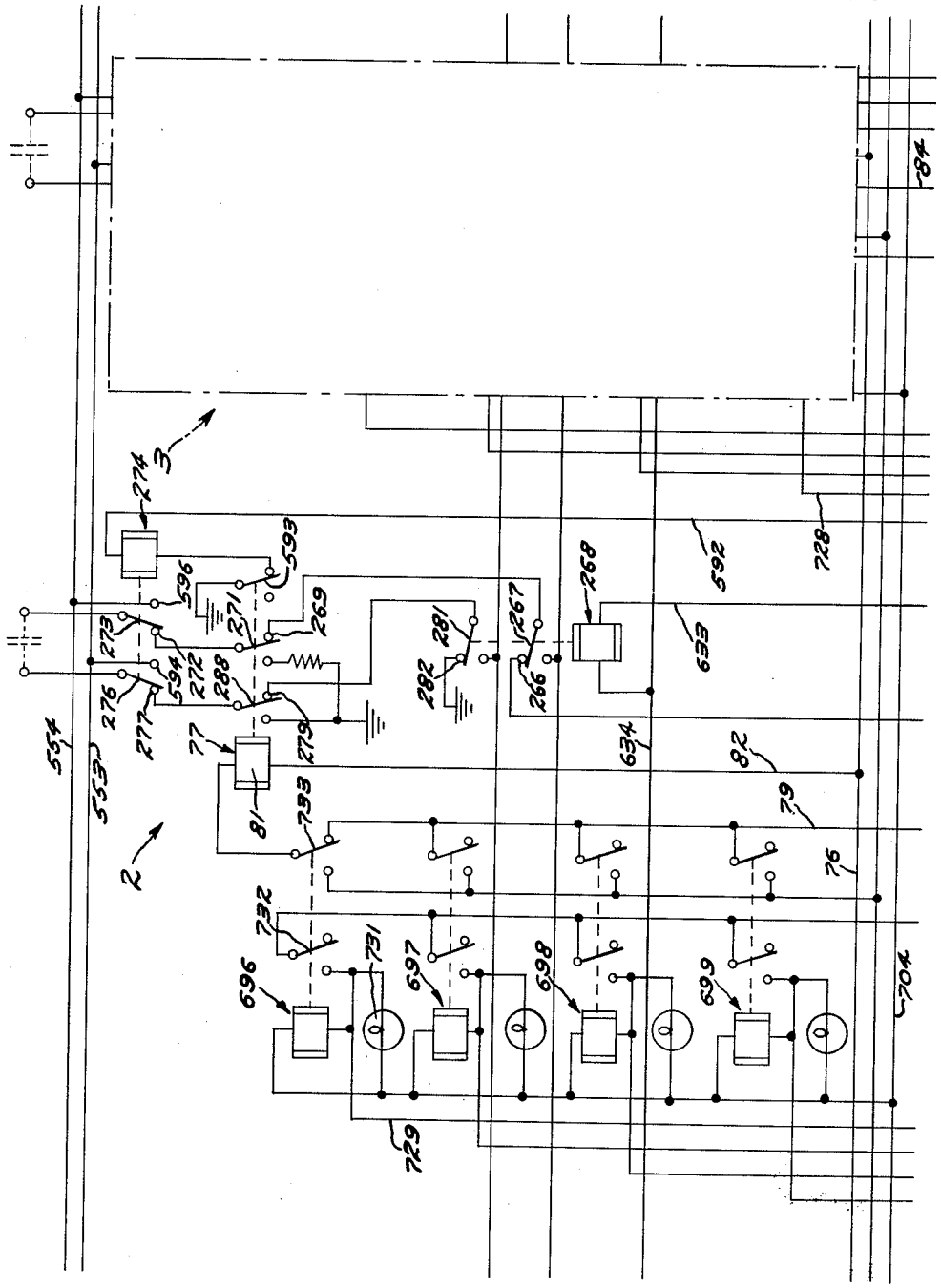
Figure 4:
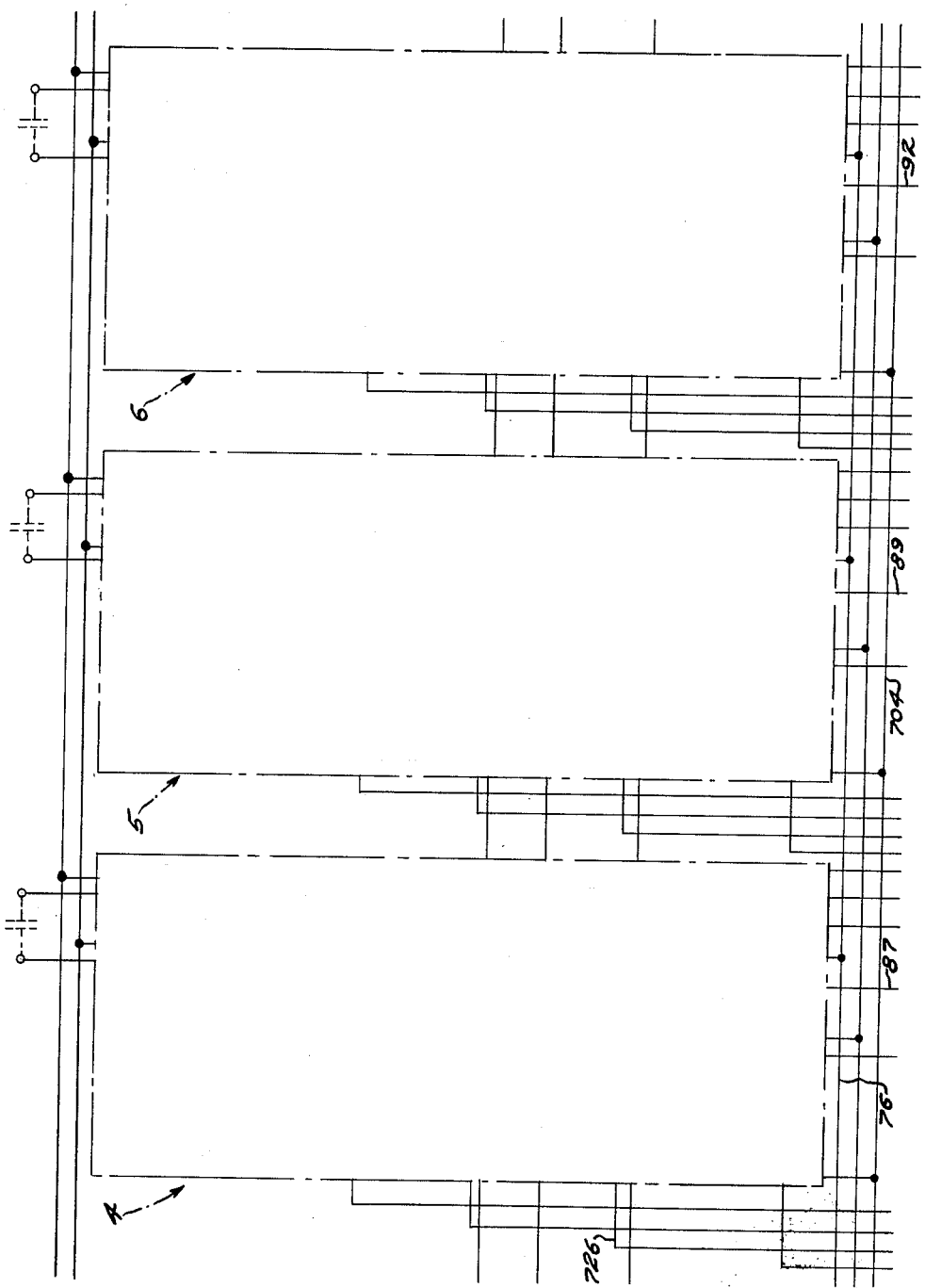
Figure 5:
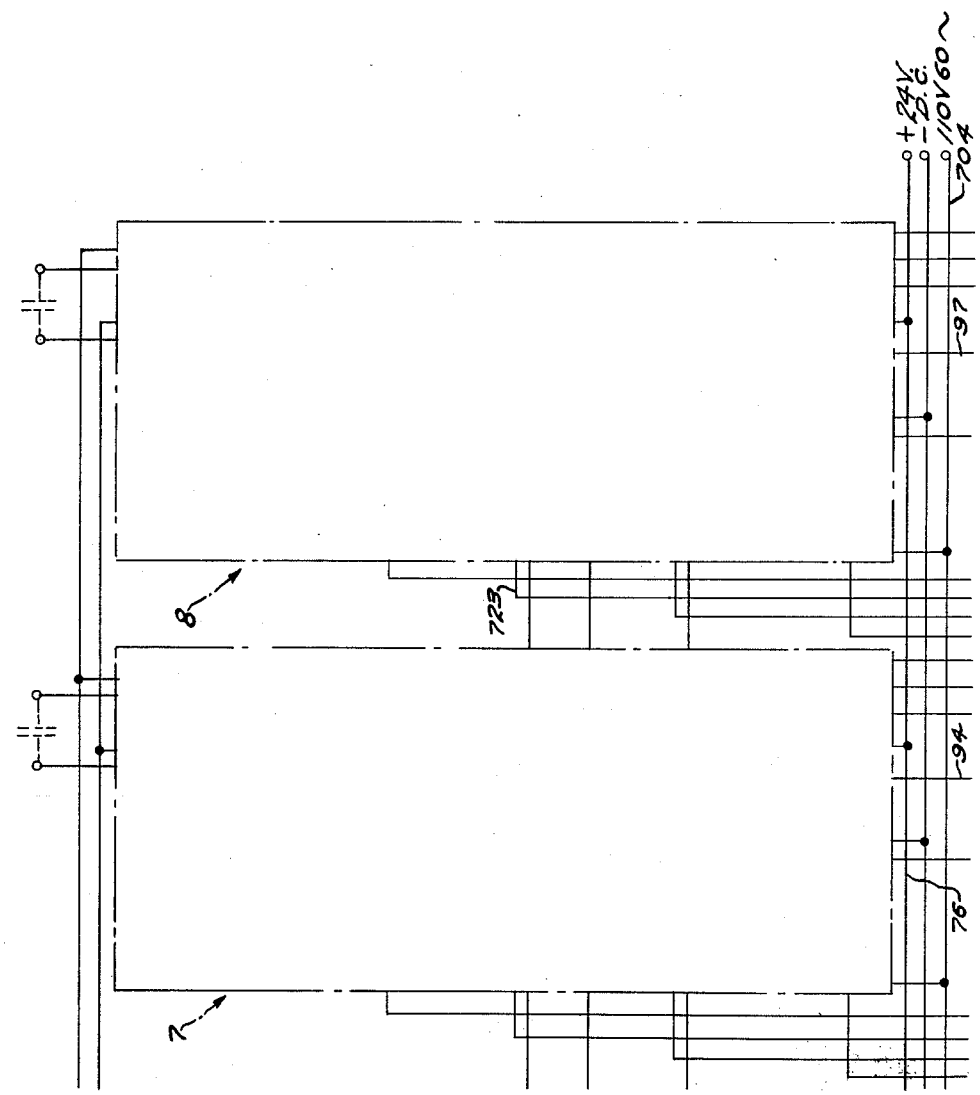
Figure 6:
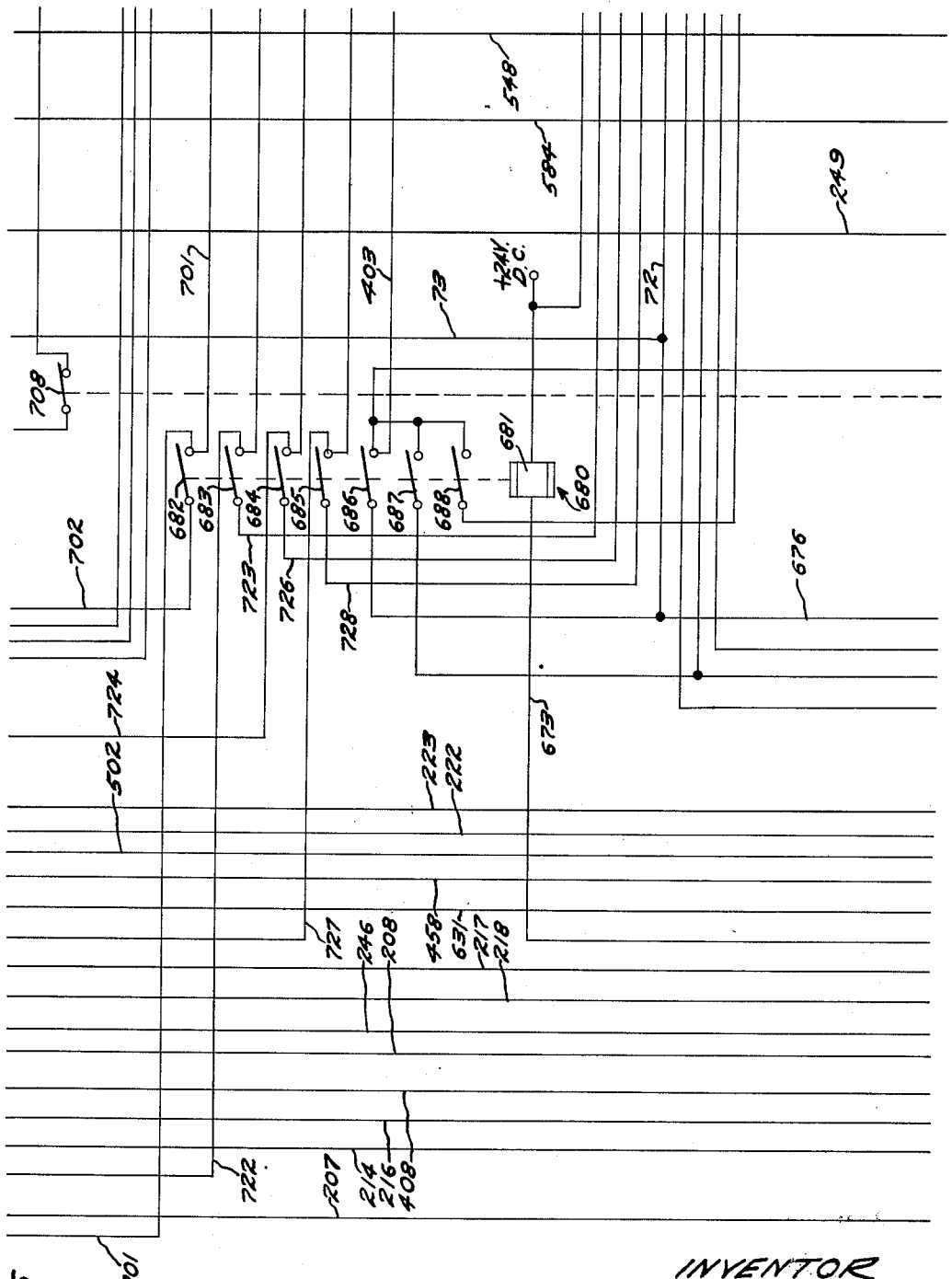
Figure 7:
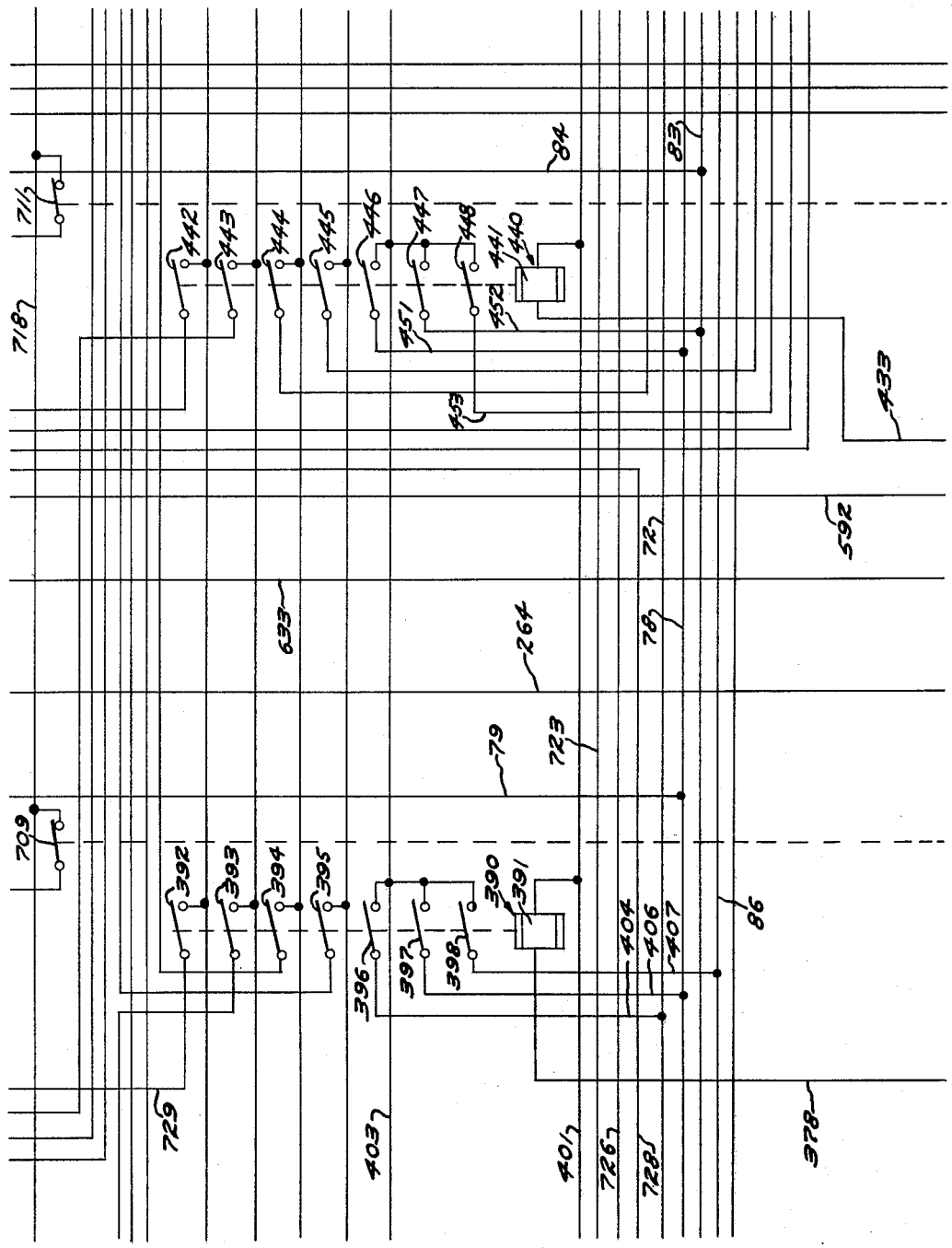
Figure 8:
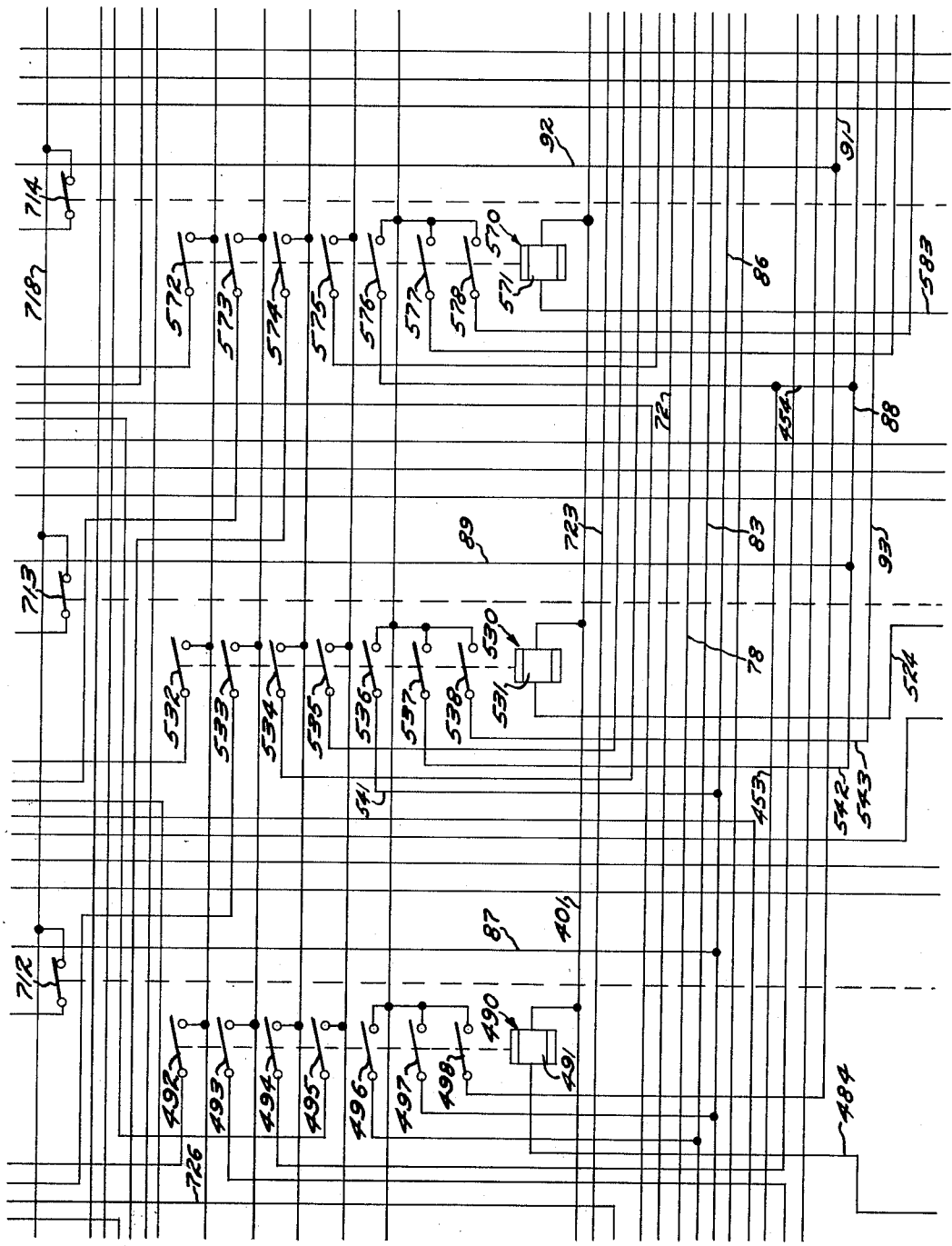
Figure 9:
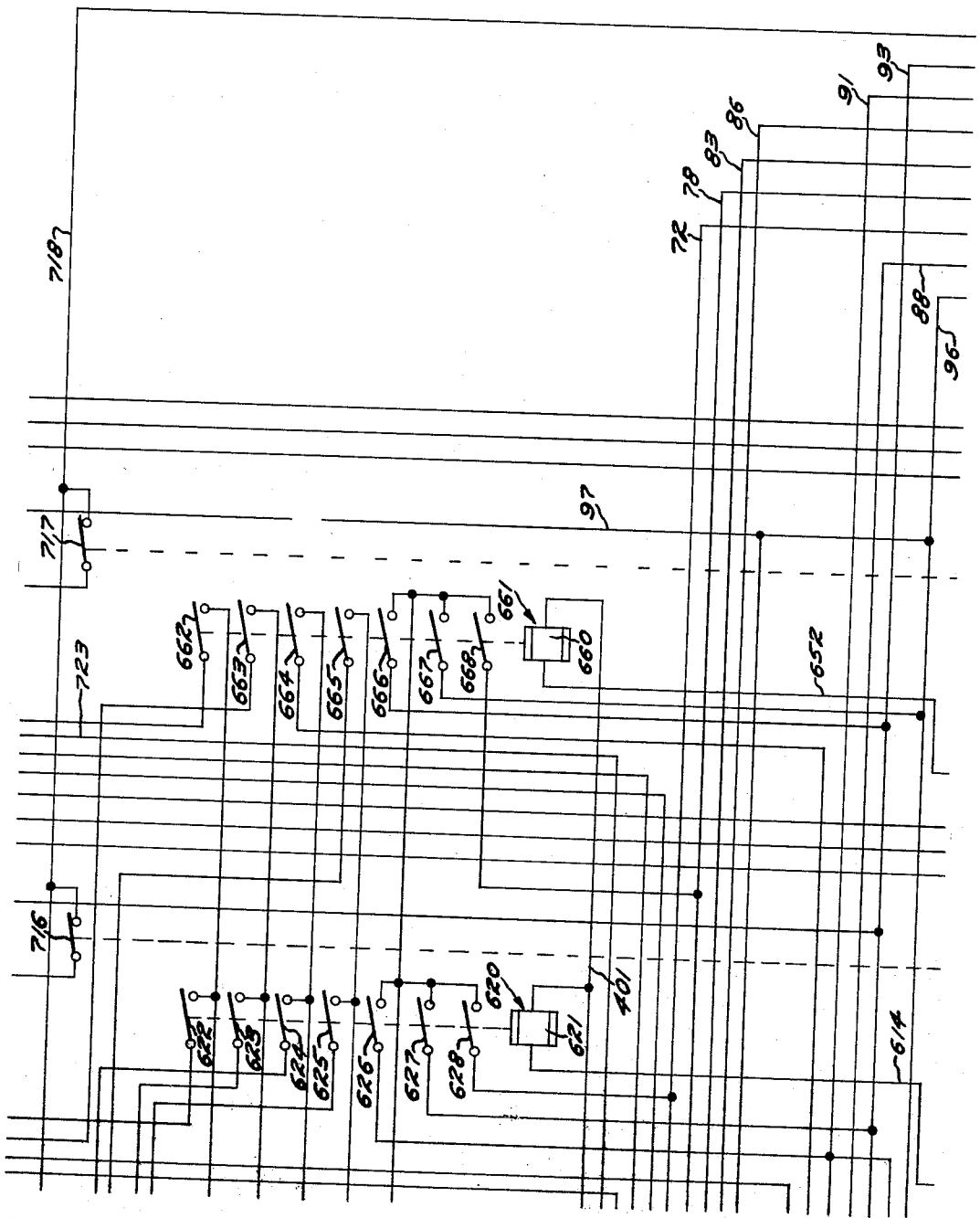

Assuming that the operator unloads test position 4, reloads the test set with a new capacitor and pushes the reset button 185 to continue the operation of the timer unit 123, the switches 141, 142 and 145 (FIG. 14) will open to discontinue the operation of the four test sets (FIG. 2). The cam 133 will again close the switch 143 to energize the relays 156, 157 and 158. A new first reset failure pulse will operate the relays 166 and 168 in the reset failure control circuit 23 and the wipers 42, 43 and 44 of banks 1, 2 and 3 will be stepped to a contact 463, the fourth contact 52 and a contact 464, respectively. A relay 470 (FIG. 12) will be operated to close contacts 471–478 through a circuit traced from one side of an A.C. source applied to the wiper 42, the contact 463, a conductor 481, a winding 482 of the relay 470 to the other side of the A.C. power source through the conductor 374.

The contacts 477 of the relay 470 energize a relay 490 from a negative terminal of a D.C. source (FIG. 10) through the conductors 283 and 284, the contacts 477, conductors 483 and 484, a winding 491 of the relay 490 to a positive terminal of a D.C. source through the conductor 401 thereby closing contacts 492–498. The relay 157 then places a negative terminal of a D.C. source through the contacts 161, the conductors 402 and 403 to the contacts 496, 497 and 498 of the relay 490. The negative D.C. potential placed on the contacts 496, 497 and 498 completes operating circuits for relays (previously discussed) at test positions 3, 4 and 6, respectively, for discharging the capacitors connected thereto to insure that the capacitors are not charged when the D.C. breakdown count, the D.C. breakdown and the capacitance tests are applied to the capacitors on the fourth testing cycle.

The fourth testing cycle then begins at the opening of the switch 143 and the closing of the switches 141, 142 and 145 which complete the operating circuits for the four test sets by energizing the relays 204, 209, 211 and 219. The contacts 471 of the relay 470 connect the insulation resistance charge circuit 1 to test position 2 through conductors 458 and 501, the contacts 471 of the relay 470, the conductors 263 and 264 through the capacitor connected to the test position 2 through a circuit previously traced to ground. The insulation resistance charge circuit 2 is connected to the test position 1 through the contacts 478 of the relay 470 from conductors 502 and 503, the contacts 478, conductors 504, 248 and 249 through the capacitor under test at the test position 1 by a circuit previously traced to ground.

The contacts 472 of the relay 470 connect the insulation resistance charge circuit 3 to the test position 8; the contacts 473 connect the D.C. breakdown count test set 12 to the test position 3; the contacts 474 connect the D.C. breakdown test set 11 to the test position 4; the contacts 475 condition test position 5 for unloading and reloading; the contacts 476 connect the capacitance test set 18 to the test position 6; and the contacts 477 connect the insulation resistance test set 17 to the test position 7. The contacts 477 of the relay 470 illuminates lamps 294, 303, 312, 321, 365, 356, 347 and 338 through conductors 483 and 506.

During this fourth cycle of testing, the operator unloads test position 5, connects a new capacitor thereto and depresses reset button 181 (FIG. 16) to prevent the reset failure circuit from removing power from the timer unit 123. In the next reset period, the switches 141, 142 and 145 of the timing and sequence circuit 22 are opened and the switch 133 is again closed to operate the relays 156, 157 and 158. The relay 158 operates the stepping relay 41 to move the wipers 42, 43 and 44 of banks 1, 2 and 3 into engagement with contact 507, the fifth contact 52 and contact 508, respectively. The wiper 42 of bank 1 causes the operation of a relay 510 from the contact 507, a conductor 521, a winding 522 of the relay 510 to an A.C. power source through the conductor 374. The relay 510 then operates to close contacts 511–518.

Closure of the contacts 518 of the relay 510 operate a relay 530 from the negative terminal of a D.C. source applied to the conductor 283 through a conductor 525, the contacts 518, conductors 523 and 524 through a winding 531 of the relay 530 to a positive terminal of a D.C. source through the conductor 401 to close contacts 532–538. The relay 157 applies negative D.C. potential through the contacts 161 to the closed contacts 536–538 of the relay 530 through the conductors 402 and 403 which in turn places the negative potential on test positions 4, 5 and 7 through conductors 541, 86 and 87, conductors 542, 88 and 89, and conductors 543, 93 and 94, respectively. The negative potential applied to these test positions discharge the capacitors connected thereto in preparation for the D.C. breakdown count, the D.C. breakdown and the capacitance tests during the fifth cycle of operation.

The time and sequence control circuit 22 then operates to remove ground from the three test positions and completes the operating circuits for the four test sets to begin the fifth operating cycle. The contacts 511 of the relay 510 connect the insulation resistance charge circuit 2 to the test position 2 through conductors 502 and 544, the contacts 511 of the relay 510, the conductors 263 and 264 through the capacitor connected to the test position 2 to ground through a circuit previously described. The contacts 513 connect the charge circuit 3 to the test position 1 by applying a positive terminal of a 24 volt D.C. source through conductors 546 and 547, the contacts 513 of the relay 510, a conductor 548, the winding of the relay 102 through contacts 549 of the relay 71 to ground thereby operating the relay 102. The relay 102 closes contacts 107 and 551 and contacts 99 and 552 to connect the capacitor under test to conductors 553 and 554 connected to ground and the insulation resistance charge circuit 3 respectively.

The contacts 512 of the relay 510 connect the test position 3 to the insulation resistance charge circuit 1; the contacts 514 connect the test position 4 to the D.C. breakdown count test set 12; the contacts 515 connect the test position 5 to the D.C. breakdown test set 11; the contacts 516 condition the test position 6 for unloading; the contacts 517 connect the test position 7 to the capacitance test set 18; and the contacts 518 connect the test position 8 to the insulation resistance test set 17. The contacts 518 also connect negative D.C. potential through conductors 523 and 556 to illuminate lamps 366, 357, 348, 331, 322, 313, 304 and 295 to indicate the particular test sets and test conditioning circuits that are connected to the test positions as shown on the test sequence chart for the fifth cycle of operation when the relay 510 is operated.

During the fifth testing cycle, the operator unloads and reloads the test position 6 and pushes reset button 182 to prevent the second reset failure pulse, caused by the operation of the relay 156, from removing power from the timer unit 123. The time and sequence control circuit 22 thereafter opens the operating circuits of the four test sets and operates the stepping relay 41 to move the wipers 42, 43 and 44 of banks 1, 2 and 3 to contact 557, the sixth contact 52 and contact 558, respectively. The wiper 42 operates a relay 560 (FIG. 12) through the contact 557 and conductor 559 to close contacts 561–568. The contacts 561 of the relay 560 operate a relay 570 through a circuit from a negative terminal of a D.C. source through conductors 283 and 581, the contacts 561, conductors 582 and 583, a winding 571 of the relay 570 to a positive terminal of a D.C. source through the conductor 401 thereby closing contacts 572–578. The relay 157 (FIG. 14) places negative D.C. voltage on the contacts 576–578 of the relay 570 which in turn places the negative voltage on the test positions 5, 6 and 8 to discharge the capacitors connected thereto through ground. The timer unit 123 then operates to complete the operating circuits of the four test sets to begin the sixth testing cycle.

The contacts 561 of the relay 560 connect the test position 1 to the insulation resistance test set 17 by applying a negative terminal of a 24 volt D.C. source through conductors 283 and 581, the contacts 561, conductors 582 and 584 through the winding of the relay 253 to a positive terminal of a 24 volt D.C. source thereby operating the relay 253 and closing contacts 252 and 586 and contacts 258 and 587. Closure of these contacts connect the capacitor on test position 1 to conductors 588 and 589 connected to the insulation resistance test set 17 and ground respectively. The contacts 564 of the relay 560 connect the test position 2 to the insulation resistance charge circuit 3 by applying a positive D.C. source through conductors 546 and 591, the contacts 564, a conductor 592 through the winding of the relay 274 and contacts 593 of the relay 77 to ground thereby operating the relay 274. Operation of the relay 274 closes contacts 276 and 594 and contacts 273 and 596 to connect the capacitor under test across the conductors 553 and 554 connected to ground and the insulation resistance charge circuit 3 respectively.

The contacts 562 of the relay 560 connect the test position 3 to the insulation resistance charge circuit 2; the contacts 563 connect the test position 4 to the insulation resistance charge circuit 1; the contacts 565 connect the test position 5 to the D.C. breakdown count test set 12; the contacts 566 connect the test position 6 to the D.C. breakdown test set 11; the contacts 567 condition the test position 7 for unloading; and the contacts 568 connect the test position 8 to the capacitance test set 18. The contacts 561 also place negative D.C. voltage through a conductor 597 to operate indicating lamps 367, 358, 341, 332, 323, 314, 305 and 296 to indicate that the particular test sets and test conditioning circuits disclosed in the test sequence chart are connected to test positions 1-8 in the sixth cycle of operation when the relay 560 is operated.

The time and sequence control circuit 22 again steps the relay 41 to place the wipers 42, 43 and 44 on contact 598, the seventh contact 52 and contact 599, respectively, to operate a relay 600 (FIG. 13) through a conductor 611 to close contacts 601-608. Closure of the contacts 602 complete an energizing circuit from a negative terminal of a D.C. source to conductors 283 and 612, the contact 602, conductors 613 and 614, a winding 621 of the relay 620 to a positive terminal of a D.C. source through the conductor 401 thereby closing contacts 622-628. Closure of the contacts 626-628 apply negative D.C. voltage, placed on the contacts from the contacts 161 of relay 157, through the conductors 402 and 403 to the test positions 6, 7 and 1 to discharge the capacitors connected thereto before the capacitors are connected to the D.C. breakdown count, the D.C. breakdown and the capacitance test sets.

The time and sequence control circuit 22 then closes the operating circuits for the four test sets to begin the seventh testing cycle. The contacts 601 of the relay 600 connect the capacitance test set 18 to the test position 1 through conductors 631 and 632, the contacts 601, the conductors 248 and 249 through the capacitance under test to ground through a circuit previously described. The contacts 602 of the relay 600 connect the insulation resistance test set 17 to the test position 2 by applying a negative D.C. potential through conductors 283 and 612, the contacts 602, a conductor 633, a winding of the relay 268 to a positive terminal of a D.C. source through a conductor 634.

The contacts 603 of the relay 600 connect the test position 4 to the insulation resistance charge circuit 2; the contacts 604 connect the test position 5 to the insulation resistance charge circuit 1; the contacts 605 connect the test position 3 to the insulation resistance charge circuit 3; the contacts 606 connect test position 6 to the D.C. breakdown count test set 12; the contacts 607 connect the test position 7 to the D.C. breakdown test set 11; and the contacts 608 condition the test position 8 for unloading. The contacts 602 of the relay 600 also apply negative D.C. potential through conductors 613 and 636 across lamps 368, 351, 342, 333, 324, 315, 306 and 297 to indicate that the various test sets and test conditioning circuits are being applied to test positions 1-8 as indicated in the test sequence chart for operating cycle 7 when the relay 600 is operated.

During the seventh cycle of operation, the operator unloads and reloads the test position 8 and pushes reset button 184 (FIG. 17) and the timing and sequence control circuit 22 again operates the stepping relay 41 after the end of the seven and a half second testing period. The wipers 42, 43 and 44 are positioned on a contact 637, the contact 46 and a contact 638 by the operation of the stepping relay 41. The wiper 42, in engaging the contact 637, operates a relay 640 (FIG. 13) by applying one side of an A.C. source through a conductor 639, a winding 651 of the relay 640 to the other side of the A.C. power source through the conductor 374 to close contacts 641-648. The contacts 643 complete an energizing circuit for a relay 660 through a conductor 652 to a winding 661 of the relay 660 to close contacts 662-668. The contacts 666-668 of relay 660 apply the negative D.C. voltage from contacts 161 of the relay 157 to test positions 7, 8 and 2 to discharge the relays connected thereto in preparation for the D.C. breakdown count, the D.C. breakdown and the capacitance test sets which are to be connected to these test positions during the eighth cycle of operation.

The timing and sequence control circuit 22 then closes the operating circuits for the four test sets. The contacts 641 condition the test position 1 for unloading by connecting ground through the resistor 261, a conductor 653, the contacts 641, the conductors 248 and 249 to the test position 1 through a circuit previously described. The contacts 642 connect the test position 2 to the capacitance test set 18 through the conductor 631, the contacts 642, the conductors 263 and 264 to ground through the capacitor connected to the test position 2 through a circuit previously described.

The contacts 643 of the relay 640 connect the test position 3 to the insulation resistance test set 16; the contacts 644 connect the test position 5 to the insulation resistance charge circuit 2; the contacts 645 connect the test position 6 to the insulation resistance charge circuit 1; the contacts 646 connect the test position 4 to the insulation resistance charge circuit 3; the contacts 647 connect the test position 7 to the D.C. breakdown count test set 12; and the contacts 648 connect the test position 8 to the D.C. breakdown test set 11. The contacts 643 also apply negative D.C. potential through a conductor 671, lamps 361, 352, 343, 334, 325, 316, 307 and 298 to positive D.C. potential for indicating that the various test sets and test conditioning circuits disclosed in the test sequence chart are connected to the various test positions during the eighth cycle of operation when the relay 640 is operated.

After the eight cycle of testing operations have been completed, the time and sequence control circuit 22 again operates to restore the relays 640 and 660 and to again operate the relay 230 by stepping the wipers 42, 43 and 44 back to the first contacts 202, 52 and 203. The relay 203 is again operated as previously described to close the contacts 231-238. The contacts 234 complete an energizing circuit to a winding 681 of a relay 680 through conductors 285 and 673 to close contacts 682-688. As the relay 157 is operated and the contacts 161 are closed, negative D.C. potential is applied to the contacts 686-688 of the relay 680 to direct the negative potential to the test positions 1, 3 and 8 to discharge through ground the capacitors connected thereto before the capacitors are connected to the D.C. breakdown, the capacitance and the D.C. breakdown count test sets.

When the time and sequence control circuit 22 again completes the operating circuits of the four test sets, the testing system is ready to repeat the eight operating cycles previously described. If the eight previously described operating cycles were the first cycles after the start button 34 initiated operations, the test positions would not be unloaded and reloaded, but the reset buttons 181-188 would merely be pushed, thereby insuring that every capacitor receives completely every test. Then, upon all successive operating cycles, the test position indicated as being conditioned for unloading would then be unloaded, reloaded with a new capacitor to be tested and reset.

As the operator may be required to physically remove the capacitors at the stations conditioned for unloading, it is necessary to insure that the capacitors have been completely discharged. As mentioned in the previous discussion, relays 230, 380, 240, 470, 510, 560, 600 and 640 have contacts to discharge the capacitors at the test positions in preparation for the unloading and reloading operations. The discharging circuits closed by these contacts serve merely as a safety or auxiliary circuit to discharge the capacitors in the event main capacitor discharging circuits are not operative.

The main capacitor discharging circuits are connected to the various test positions through the contacts of the third bank of the multiple stepping switch. The contacts on the third bank are connected to the test positions which are to be conditioned for unloading, as directed by the related contacts of the first bank and the associated relay in the test stepping control circuit of FIGS. 10–13. For example, assuming the wiper 42 to be positioned on the eighth contact 637, the relay 640 would then operate to connect the test positions to the test sets and test conditioning circuits disclosed in the eighth cycle of operation as shown on the test sequence chart. As seen from the test sequence chart, test position 1 is to be conditioned for unloading. When the wiper 42 of the first bank is engaging the contact 637, the wiper 44 of the third bank engages the contact 638 to place a negative terminal of a 24 volt D.C. source through a conductor 674, the wiper 44, the contact 638, conductors 676, 72 and 73, the winding 74 of the relay 71 to a positive terminal of a 24 volt D.C. source through the conductor 76 thereby operating the relay 71. Operation of the relay 71 closes the contacts 103 and 104 and the contacts 109 and 111 to discharge the capacitor connected to test position 1 to ground through the resistor 112. If the primary discharging circuit through wiper 44 of bank 3 does not operate to energize relay 71 and thereby fails to close the contacts 103 and 104 and the contacts 109 and 111, the discharge path provided through the contacts 641 of the relay 640 are effective in discharging the capacitor through the contacts 103 and 257 and the contacts 109 and 256 of the unoperated relay 71.

*Capacitor Rejection Circuit*

Each of the test positions is provided with four rejection indicator relays, as relays 691–694 disclosed in detail in test position 1 and relays 696–699 disclosed in detail in test position 2. These relays are connected to one of the four test sets which are in turn provided with circuits of any commercially available type for placing one terminal of an A.C. power source on the relays upon failure of any capacitor tested thereby. For example, during the first testing cycle, when the relay 230 operates the relay 680, the D.C. breakdown test set 11 is connected to relay 691 upon failure of the capacitor connected to the test position 1, through a conductor 701, the contacts 682 of the relay 680, a conductor 702, the winding of the relay 691 and a lamp 703 to the other side of an A.C. source through a conductor 704 thereby operating the relay 691 and the lamp 703.

Operation of the relay 691 closes contacts 706 to complete a locking circuit for the relay 691 through a conductor 707, an auxiliary contact 708 of the reset button 188, a conductor 718, the contacts 244 of relay 27 (FIG. 17), the conductors 38 and 32 to the other side of an A.C. power source. Operation of the relay 691 also closes contacts 719 and 721 to operate the relay 71 to immediately discharge the failed capacitor to ground. The relay 691 thereby remains operated until the test position 1 is conditioned for unloading and the reset button 188 is pushed.

It may therefore be seen that after a capacitor fails to pass one of the tests applied thereto, the capacitor is immediately discharged and remains in that condition until the test position is prepared for unloading. A lamp is also operated to indicate to the operator, when unloading the defective capacitor, which of the tests the capacitor failed. The D.C. breakdown count test set 12 is connected through a conductor 722, the contacts 683 of the relay 680 and a conductor 723 to the test position 8; the insulation resistance test set 17 is connected through a conductor 724, the contacts 684 and a conductor 726 to the test position 4; and the capacitance test set 18 is connected through a conductor 727, the contacts 685 of the relay 680, a conductor 728 to the test position 3.

In case of failures in the second cycle of operation, the relay 390 connects the D.C. breakdown test set through the conductor 701, the contacts 392 of the relay 390 and conductor 729 to the relay 696 at test position 2 thereby operating the relay and illuminating a lamp 731 associated therewith. The relay 696 then closes a locking circuit through contacts 732 and operates the relay 77 through contacts 733 to discharge the capacitor connected to test position 2. The relay 696 remains operated until auxiliary contacts 709 on the reset button 187 are pushed to break the locking circuit for the relay. The contacts 393 of the relay 390 connect the D.C. breakdown count test set 12 to the relay 692 of the test position 1 to indicate a failure in a similar manner. The contacts 394 of the relay 390 connect the insulation resistance test set 17 to test position 5 and the contacts 395 connect the capacitance test set 18 to the test position 4 in the case of capacitor failures at these test positions.

In a manner as described in connection with the relays 680 and 390, the contacts 442–445 of the relay 440 connect the D.C. breakdown test set 11, the D.C. breakdown count test set 12, the insulation resistance test set 17 and the capacitance test set 18 to the test positions 3, 2, 6 and 5, respectively. The contacts 492–495 of the relay 490 connect the D.C. breakdown test set 11, the D.C. breakdown count test set 12, the insulation resistance test set 17 and the capacitance test set 18 to the test positions 4, 3, 7 and 6, respectively. The contacts 532–535 of the relay 530 connect the test sets 11, 12, 17 and 18 to the test positions 5, 4, 8 and 7; the contacts 572–575 of the relay 570 connect the test sets 11, 12, 17 and 18 to the test positions 6, 5, 1 and 8, respectively; the contacts 622–625 of the relay 620 connect the test sets 11, 12, 17 and 18 to the test positions 7, 6, 2 and 1, respectively; and the contacts 662–665 of the relay 660 connect the test sets 11, 12, 17 and 18 to the test positions 8, 7, 3 and 2, respectively. In each case, the connection is only completed by a circuit (not shown) within the test sets which connects the circuits to one side of an A.C. source in case the capacitor under test fails to meet the required standards.

The above-described testing system may be expanded to handle more tests and test positions or may be used for a lesser number than described by following the general principles as outlined above. The time and sequence control circuit has been described as having a single cam for each test set, however, the number of cams for each test set would depend upon the number of controls that it is desired to have within each test set. The testing system as described will connect seven test sets and test conditioning circuits to seven capacitor test fixture positions while an eighth test position is prepared for unloading and reloading. The unloading and reloading test position can be eliminated if desired and replaced to handle an eighth test if the contacts on the relays 390, 440, 490, 530, 570, 620, 660 and 680 are connected to discharge all test positions in the reset period such that completely tested capacitors could be removed and replaced between testing cycles.

The testing system connects each of the test sets and test conditioning circuits to each test position in eight operating cycles whereby the capacitor at each test position is either being tested, prepared for a test or unloaded at all times during the testing operation and no capacitor is required to wait until tests are completed at the other test positions before being tested. Each time the test set is stopped by means of the stop button 26, the testing system automatically prepares to connect the first test set to the first test position to insure that each capacitor receives completely every test. The tesing sysem may be stopped at any time during any operating cycle but can only be started at the beginning of the first operating cycle. The testing system is automatically halted at the end of each testing cycle until an operator unloads and reloads the test position conditioned therefor and resets the testing system by means of a reset button. The testing system is also provided with indicating means for disclosing to an operator the exact test that is being performed at each test position during all testing cycles and, in case a defective capacitor is tested, indicating means are provided to inform the operator the particular test the defective capacitor fails. Means are also provided to discharge any capacitor failing a test and to maintain the capacitor in that condition until the test position to which the capacitor is connected is conditioned for an unloading and reloading operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A multiple testing system which comprises, a plurality of test positions each having an electrical device connected thereto, a plurality of test sets and test conditioning circuits connectible to the test positions for testing the electrical devices, means operable through a series of operating cycles for connecting each test set and test conditioning circuit to each test position in a predetermined sequence, and means for controlling said connecting means through a series of operating cycles to simultaneously connect one of the test sets and test conditioning circuits to each of the test positions during each cycle of operation such that the electrical devices are simultaneously and continuously tested.

2. In a system for testing a plurality of electrical devices, a plurality of testing networks for preparing and performing different tests, means for simultaneously connecting each network to a different electrical device, means for operating the connecting means through a plurality of cycles such that each network is connected to each electrical device in a predetermined sequence to simultaneously and continuously test each device, and means rendered effective by a defective device for preventing subsequent testing of the defective device during successive operating cycles without affecting the testing operations of the other devices.

3. A multiple testing system which comprises, a plurality of test positions each being arranged to have an electrical device connected thereto, a plurality of test sets and test conditioning circuits connectible to the test positions for testing the electrical devices, means operable through a series of operating cycles for connecting each test set and test conditioning circuit to different test positions in a predetermined sequence, means for controlling said connecting means through a series of operating cycles to connect one of the test sets or test conditioning circuits to each of the test positions during each cycle of operation such that the devices are simultaneously and continuously tested, means operated by said connecting means for indicating the test set or test conditioning circuit connected to each test position during each operating cycle, means rendered effective by a defective device for preventing subsequent testing of the defective device during successive operating cycles without affecting the testing operations at the other test positions, and means operated by the preventing means for indicating the test the defective device failed.

4. In a system for testing electrical devices, a plurality of test positions each being arranged to have an electrical device connected thereto, a plurality of testing networks for preparing and performing tests on said devices, cyclically operated means for simultaneously connecting all but one of the test positions to different ones of the networks during a first of the operating cycles, means within the cyclically operated means for conditioning said one test position for unloading and reloading, and means for operating said cyclically operated means through continuous operating cycles to connect the different networks and the conditioning means to different test positions such that each test position will be sequentially connected to each network and then conditioned for unloading and reloading.

5. In a system for testing electrical devices, a plurality of test positions each being arranged to have an electrical device connected thereto, a plurality of testing networks for preparing and performing tests on said devices, cyclically operated means for simultaneously connecting all but one of the test positions to a different one of the networks during a first of the operating cycles, means within the cyclically operated means for conditioning said one test position for unloading and reloading, means for operating said cyclic operated means through continuous operating cycles to connect the different networks and conditioning means to different test positions such that each test position will be sequentially connected to each network and then conditioned for unloading and reloading, means for stopping said operating means during any operating cycle, and means responsive to said stopping means for actuating said cyclically operated means to connect said conditioning means to a predetermined one of said test positions regardless of the station to which said conditioning means is connected when said stopping means operates.

6. In a system for testing electrical devices, a plurality of test positions each being arranged to have an electrical device connected thereto, a plurality of testing networks for preparing and performing tests on said devices, cyclically operated means for simultaneously connecting all but one of the test positions to a different one of the networks during a first of the operating cycles, means within the cyclic operated means for conditioning said one test position for unloading and reloading, means for operating said cyclically operated means through continuous operating cycles to connect the different networks and conditioning means to different test positions such that each test position will be sequentially connected to each network and then conditioned for unloading and reloading, first means for indicating the networks and the conditioning means connected to each test position during each cycle of operation, means rendered effective by a defective device for preventing further testing of the defective device by networks connected to the test position until the position is conditioned for unloading and reloading without affecting the connection of the networks to the other test positions, and second means operated by the preventing means for indicating the test the defective device failed.

7. In a system for testing electrical devices, a plurality of test positions each being arranged to have an electrical device connected thereto, a plurality of testing networks for preparing and performing tests on the devices, a plurality of means each for simultaneously connecting in a different manner each network to a different one of the test positions and conditioning one test position for unloading and reloading such that each test position is connectible to each network and is conditioned for unloading and reloading by one of the connecting means, means for sequentially operating the connecting means for continuously testing the devices and producing a completely tested device at the conditioned position upon the operation of each connecting means, first means for indicating the network connected to each test position and the test position conditioned for unloading and reloading during the operation of each connecting means, means operated by a defective device for preventing further testing of said device until the test position to which the device is connected is conditioned for unloading and reloading without affecting the testing of the other devices, and second means operated by the preventing means for indicating the test said defective device failed.

8. In a system for testing electrical devices, a plurality of test positions each being arranged to have an electrical device connected thereto, a plurality of testing networks for preparing and performing tests on the devices, cyclically operated means for simultaneously connecting all but one of the test positions to a different one of the networks, means within the cyclically operated connecting means for conditioning said one test position for unloading and reloading, stepping means for operating said cyclically connecting means through one cycle of operation for every stepping movement thereof such that the various networks and the conditioning means are connected to different test positions for each operating cycle, said stepping means having the number of steps required to connect each test position to each network and the conditioning means, means for intermittently operating the stepping means such that the devices are continuously tested and one device is completely tested at the conditioned position upon each operation of the stepping means, circuit means for stopping the intermittently operating means at the end of each operating cycle of the cyclic operated connecting means, and a reset switch associated with each test position and each connected within the circuit means for operation after unloading and reloading of the conditioned test position to render the circuit means non-operative.

9. In a system for testing electrical devices, a plurality of test positions each being arranged to have an electrical device connected thereto, a plurality of testing networks for preparing and performing tests on the devices, cyclically operated means for simultaneously connecting all but one of the test positions to a different one of the networks, means within the cyclic operated connecting means for conditioning said one test position for unloading and reloading, stepping means for operating said cyclically operated connecting means through one cycle of operation for every stepping movement thereof such that the various networks and the conditioning means are connected to different test positions for each operating cycle, said stepping means having the number of steps required to connect each test position to each network and the conditioning means, continuously rotating cam means for moving said stepping means one stepping movement in the initial portion of each complete rotation thereof and controlling the networks in the remainder of each complete rotation such that the devices are continuously tested and one device is completely tested at the conditioned position upon each rotation of the cam means, circuit means for stopping the camming means at the end of each complete rotation thereof, and a reset switch associated with each test position and each connected within the circuit means for operation after unloading and reloading of the conditioned test position to render the circuit means non-operative.

10. In a system for testing electrical devices, a plurality of test positions each being arranged to have an electrical device connected thereto, a plurality of testing networks for preparing and performing tests on the devices, a plurality of means each for simultaneously connecting in a different manner each network to a different one of the test positions and conditioning one test position for unloading and reloading such that each test position is connectible to each network and is conditioned for unloading and reloading by one of the connecting means, stepping means for operating one of the connecting means upon each stepping movement thereof, said stepping means having a number of steps equal to the number of connecting means for connecting each test position to each network and conditioning each test position for unloading and reloading, and means for intermittently operating the stepping means to produce one completely tested device at the conditioned position for each movement of the stepping means.

11. A semi-automatic stepping device which comprises, a wiper, a plurality of contacts individually engageable by said wiper for completing circuits connected thereto, means for moving the wiper for connection with each contact for a predetermined time interval, circuit means for stopping the moving means at the end of each time interval to prevent further movement of the wiper, and a reset switch connected within the circuit means and operable at any time within the time interval for rendering the circuit means ineffective.

12. A semi-automatic stepping device which comprises, a wiper, a plurality of contacts individually engageable by said wiper for completing circuits connected thereto, continuously rotating cam means for moving the wiper into engagement with one of the contacts during the initial portion of each complete rotation thereof, circuit means for stopping the cam means at the end of each complete rotation, and a reset switch operable at any time within the remaining portion of each rotation of the cam means for rendering the circuit means ineffective.

13. A semi-automatic stepping device which comprises, a wiper, a plurality of contacts individually engageable by said wiper, continuously rotating cam means for moving the wiper into engagement with one of the contacts during the initial portion of each complete rotation thereof, a reset circuit conditioned for operation by the cam means during said initial portion of each rotation, means operated by the end portion of each rotation of the cam means for operating the reset circuit to stop the cam means at the end of each rotation, and a reset switch operable at any time after the initial portion of each rotation for rendering the reset circuit ineffective.

References Cited in the file of this patent

UNITED STATES PATENTS

| | | |
|---|---|---|
| 2,481,033 | Nelsen | Sept. 6, 1949 |
| 2,529,227 | Rosenblum | Nov. 7, 1950 |
| 2,576,903 | Imm | Nov. 27, 1951 |
| 2,577,681 | Haskett | Dec. 4, 1951 |
| 2,849,677 | Hannon | Aug. 26, 1958 |
| 2,869,076 | Evans et al. | Jan. 13, 1959 |
| 2,927,225 | Phillips | Mar. 1, 1960 |
| 2,932,791 | Carrington | Apr. 12, 1960 |
| 2,956,226 | Vogt et al. | Oct. 11, 1960 |

FOREIGN PATENTS

| | | |
|---|---|---|
| 167,947 | Australia | July 12, 1956 |

OTHER REFERENCES

"Automatic Functional Tester," article in Electronic Design, June 15, 1956, pages 46 and 47.